(12) United States Patent
Knapp et al.

(10) Patent No.: US 7,023,658 B1
(45) Date of Patent: Apr. 4, 2006

(54) SUBMICRON TRACK-WIDTH POLE-TIPS FOR ELECTROMAGNETIC TRANSDUCERS

(75) Inventors: Kenneth E. Knapp, Livermore, CA (US); Ronald A. Barr, Mountain View, CA (US); Zhupei Shi, San Jose, CA (US); Billy W. Crue, Jr., Pittsburgh, PA (US)

(73) Assignee: Western Digital (Fremont), Inc., Fremont, CA (US)

( * ) Notice: Subject to any disclaimer, the term of this patent is extended or adjusted under 35 U.S.C. 154(b) by 0 days.

(21) Appl. No.: 09/500,380

(22) Filed: Feb. 8, 2000

(51) Int. Cl.
*G11B 5/31* (2006.01)
*G11B 5/187* (2006.01)
*G11B 5/265* (2006.01)
*G11B 5/39* (2006.01)

(52) U.S. Cl. .................. 360/126; 360/122; 360/317
(58) Field of Classification Search ........... 360/317, 360/126, 122
See application file for complete search history.

(56) References Cited

U.S. PATENT DOCUMENTS

| | | | | |
|---|---|---|---|---|
| 5,459,099 | A | 10/1995 | Hsu ........................ | 437/180 |
| 5,559,654 | A | 9/1996 | Das ......................... | 360/126 |
| 5,621,596 | A | 4/1997 | Santini ..................... | 360/126 |
| 5,793,578 | A * | 8/1998 | Heim et al. ............... | 360/126 |
| 5,805,391 | A * | 9/1998 | Chang et al. ............. | 360/122 |
| 5,850,326 | A * | 12/1998 | Takano et al. ............ | 360/122 |
| 5,890,278 | A * | 4/1999 | Van Kesteren | |
| 6,043,960 | A | 3/2000 | Chang et al. ............. | 360/126 |
| 6,054,023 | A | 4/2000 | Chang et al. ............. | 204/192.2 |
| 6,111,724 | A | 8/2000 | Santini ..................... | 360/126 |
| 6,172,848 | B1 | 1/2001 | Santini ..................... | 360/126 |
| 6,190,764 | B1 * | 2/2001 | Shi et al. .................. | 360/122 |
| 6,317,289 | B1 * | 11/2001 | Sasaki ...................... | 360/126 |
| 6,329,211 | B1 * | 12/2001 | Terunuma et al. ........ | 360/126 |
| 6,330,127 | B1 * | 12/2001 | Sasaki ...................... | 360/126 |
| 6,337,783 | B1 * | 1/2002 | Santini ..................... | 360/317 |
| 6,339,524 | B1 * | 1/2002 | Furusawa et al. ......... | 360/317 |
| 6,483,664 | B1 * | 11/2002 | Kamijima .................. | 360/126 |
| 6,521,335 | B1 * | 2/2003 | Amin et al. ............... | 360/126 |
| 6,583,954 | B1 * | 6/2003 | Sasaki ...................... | 360/126 |
| 6,829,819 | B1 * | 12/2004 | Crue et al. ................ | 360/317 |

FOREIGN PATENT DOCUMENTS

JP 11-031308 * 2/1999
JP 11-213334 * 6/1999

OTHER PUBLICATIONS

Karpov et al., "Patterning of Vertical Thin Film Emitters in Filed Emission Array and their Emission Characteristics," 9th International Vacuum Microelectronics Conference, St. Petersburg 1996, pp. 501-504.

Tsutsumi et al., "Fabrication Technology of Ultrafine $SiO_2$ Masks and Si Nanowires using Oxidation of Vertical Sidewalls of a Poly-Si Layer," Journal of Vacuum Science Technology B, vol. 17, No. 1, Jan./Feb. 1999, pp. 77-81.

(Continued)

*Primary Examiner*—Craig A. Renner
(74) *Attorney, Agent, or Firm*—Sawyer Law Group LLP; Joshua G. Harrison, Esq.

(57) ABSTRACT

A trailing pole-tip for an electromagnetic transducer is formed as a layer oriented substantially perpendicular to other layers of the transducer, allowing the pole-tip to be made much thinner than conventional pole-tips. The novel pole-tip is formed on an edge or sidewall of a base layer instead of being formed on top of an existing layer. Potential errors in pole-tip thickness are much less than standard error tolerances for conventional pole-tip thickness. Having a greatly reduced pole-tip width significantly reduces the track width so that many more tracks can fit on a media surface, providing a large increase in areal density.

43 Claims, 15 Drawing Sheets

OTHER PUBLICATIONS

Ishi et al., "Highly Defined Narrow Track Write Heads Fabricated by Focused Ion Beam Trimming with the $Al_2O_3$ Refilling Process," IEEE Tranactions on Magnetics, vol. 35, No. 5, Sep. 1999, pp. 2541-2543.

Khizroev et al., "Recording Heads with Track Widths Suitable for 100 $Gbit/in^2$ Density," IEEE Transactions on Magnetics, vol. 35, No. 5, Sep. 1999, pp. 2544-2546.

* cited by examiner

SUBMICRON TRACK-WIDTH POLE-TIPS FOR ELECTROMAGNETIC TRANSDUCERS

BACKGROUND

A key measure of the performance of an electromagnetic information storage system is the areal density. The areal density is the number of data bits that can be stored and retrieved in a given area. Areal density can be computed as the product of linear density (the number of magnetic flux reversals or bits per unit distance along a data track) multiplied by the track density (the number of data tracks per unit distance). As with many other measures of electronic performance, areal densities of various information storage systems have increased greatly in recent years. For example, commercially available hard disk drive systems have enjoyed a roughly tenfold increase in areal density over the last few years, from about 500 Mbit/in$^2$ to about 5 Gbit/in$^2$.

Various means for increasing areal density are known. For instance, with magnetic information storage systems it is known that storage density and signal resolution can be increased by reducing the separation between a transducer and associated media. For many years, devices incorporating flexible media, such as floppy disk or tape drives, have employed a head in contact with the flexible media during operation in order to reduce the head-media spacing. Recently, hard disk drives have been designed which can operate with high-speed contact between the hard disk surface and the head.

Another means for increasing signal resolution that has become increasingly common is the use of magnetoresistive (MR) or other sensors for a head. MR elements may be used along with inductive writing elements, or may be separately employed as sensors. MR sensors may offer greater sensitivity than inductive transducers but may be more prone to damage from high-speed contact with a hard disk surface, and may also suffer from corrosion, so that conventional MR sensors are protected by a hard overcoat.

Recent development of information storage systems having heads disposed within a microinch (μin) of a rapidly spinning rigid disk while employing advanced MR sensors such as spin-valve sensors have provided much of the improvement in areal density mentioned above. Further increases in linear density have been hampered by demagnetizing forces from adjacent bits, which grow stronger as the bits are packed closer together, typically manifested as nonlinear transition shifts (NLTS) of longitudinal media. On the other hand, further increases in track density have been limited by constraints as to how small transducer pole-tips can be made, since the pole-tips record magnetic patterns on the media and therefore define the width of each track.

FIG. 1 (Prior Art) depicts a portion of a conventional thin film head 50 as seen from a media on which the head writes and reads. The head contains a transducer formed in a series of layers on a substrate 51, the transducer including a MR sensor 52 sandwiched between a pair of magnetically permeable shield layers 54 and 55. Layer 55 also serves as a first pole-tip of a magnetically permeable yoke that encircles a conductive coil, not shown, the first pole-tip 55 being separated from a second pole-tip 58 by a recording gap 60. In this example of a merged MR and inductive head, reading of signals is performed by the MR sensor 52, while writing of patterns on the media is performed by magnetic flux spreading out from the gap 60 while travelling between the pole-tips 55 and 58. A width W0 of the trailing pole-tip 58 thus sets a minimum width of a data track recorded on the medium. Conventional pole-tips 55 and 58 are formed by sputtering a seed layer followed by patterning a photoresist mask for electroplating, to form a layer that may be a few microns thick for carrying sufficient magnetic flux to provide adequate recording strength to the media. After electroplating through the thick mask, the mask is chemically removed and the seed layer is removed by ion beam milling, which can also be used to thin the pole-tip.

Control of the ion milling for thinning pole-tips becomes difficult for widths W0 that are less than 0.5 μm, and errors in mask definition increase with mask thickness, limiting a length-to-width aspect ratio of conventional pole-tips to less than six. Instead of ion milling at the wafer level, trimming of a pole-tip with a focused ion beam impinging upon the air-bearing surface has been proposed. Unfortunately, this leaves a cavity in that surface around the pole-tip, and tends to round the corners of the pole-tip adjacent the cavity. Moreover, trimming with an individual beam for each pole-tip is not competitive with mass production of pole-tips at the wafer level.

SUMMARY

In accordance with the present invention, a trailing pole-tip for an electromagnetic transducer is formed as a layer oriented substantially perpendicular to most if not all other layers of the transducer, allowing the pole-tip to be made much thinner than conventional pole-tips. The novel pole-tip may be formed on an edge or sidewall of a base layer instead of being formed on top of an existing layer. An advantage of such sidewall formation is that errors in pole-tip thickness can be much less than standard error tolerances for conventional pole-tip thickness. Another advantage is that such a pole-tip can be formed to a narrow width while the transducer is being mass produced along with perhaps thousands of other transducers on a wafer, instead of being formed individually on a media-facing surface after separation from other transducers. Having a greatly reduced pole-tip width can significantly reduce the track width so that many more tracks can fit on a media surface, providing large increases in areal density. For conciseness this summary merely points out a few salient features in accordance with the invention, and does not provide any limits to the invention, which is defined below in the claims.

DETAILED DESCRIPTION OF THE PREFERRED EMBODIMENT

Figure 1:
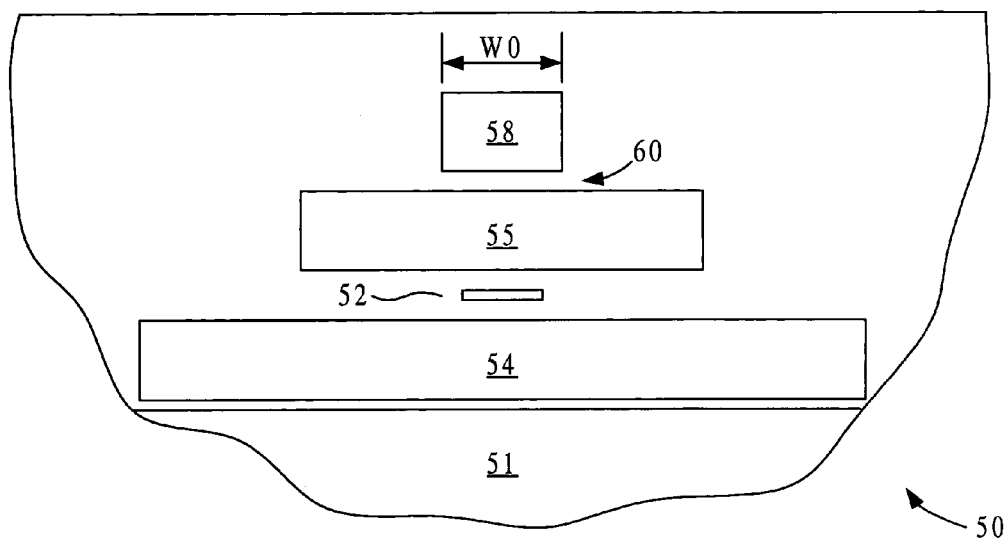
FIG. 1 (Prior Art) is a cutaway view of a media-facing side of a head focusing on a conventional transducer.
Figure 2:
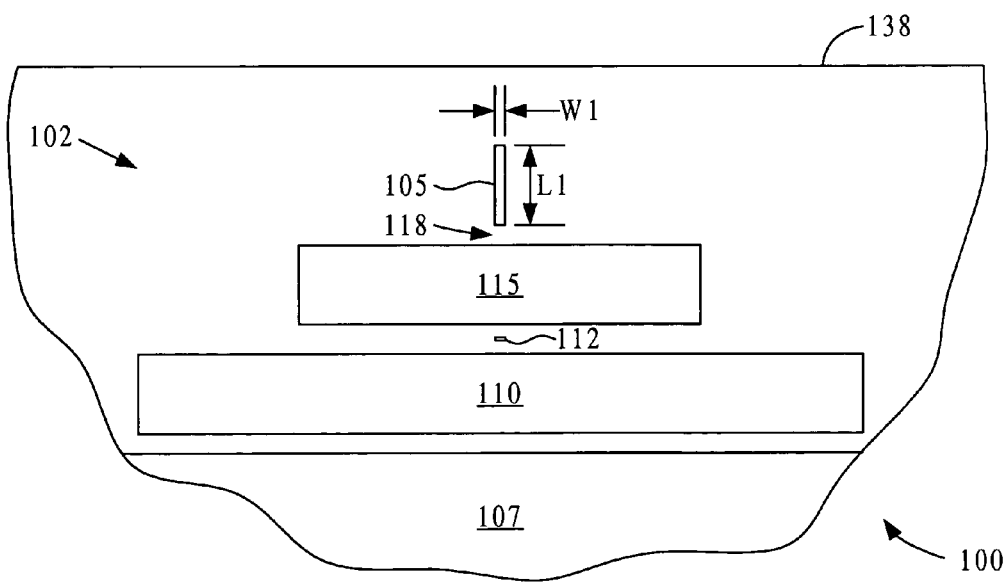
FIG. 2 is a cutaway view of a media-facing side of a head in accordance with the present invention focusing on a transducer having a narrow pole-tip.

FIG. 2 is a cutaway view of a media-facing side of a head 100 in accordance with the present invention focusing on a transducer 102 having a narrow trailing pole-tip 105. The pole-tip may have a width (W1) that is 0.3 µm or less and a length (L1) that is about 1 µm–2 µm, although either the width or length of the pole-tip can be varied by a factor of two or more. In general, a length-to-width (L1/W1) aspect ratio for pole-tip 105 may exceed six and may approach infinity. For near-term products, length-to-width aspect ratios for pole-tip 105 may be in a range between about six and one-hundred. As described in detail below, the pole-tip 105 has been deposited as a layer on a substantially vertical sidewall, and so the width W1 of the pole-tip is essentially the thickness of the layer. Such a pole-tip layer 105 can be made as thin as a few atoms in thickness, so that W1 is less than 20 Å, although such an extremely narrow pole-tip is not currently necessary. The pole-tip may be made of high magnetic saturation (high $B_s$) materials, including iron films or laminates, primarily iron NiFe (e.g., $Ni_{45}Fe_{55}$), Sendust (AlSiFe), or other known high $B_s$ compounds. Cobalt-based alloys, such as CoZrNb, CoZrNb and CoZrRe, nitrogen doped iron films, such as compounds containing FeNX, where X can be Rh, Ta or Al, or compounds containing FeCo also may be used to form a high $B_s$ pole-tip. Forming the pole-tip 105 of high $B_s$ materials can avoid magnetic saturation despite the pole-tip having a much smaller cross-sectional area than most of the remainder of the magnetic yoke, not shown in this figure. The pole-tip 105 can also be laminated to provide for extremely high frequency operation without deleterious eddy currents.

The transducer 102 is formed in a series of layers on a substrate 107, beginning with a first magnetically permeable shield layer 110. For the situation in which the shield is made of Permalloy, the shield may have a thickness of about 2 µm and a width that is several times larger than its thickness. A first amagnetic (non-ferromagnetic), electrically insulating read gap layer is formed on the first shield 110 to separate the first shield from a MR sensor 112. A second amagnetic, electrically insulating read gap layer is formed on the MR sensor 112 to separate the MR sensor from a second shield 115. The read gap layers may have a thickness in a range between about 50 Å and 400 Å, and may be formed of a variety of materials including Alumina, DLC, SiC and $SiO_2$. Second shield 115 also serves as a first pole-tip of a magnetically permeable yoke that encircles a conductive coil, not shown in this figure, the first pole-tip 115 being separated from the trailing pole-tip 105 by an amagnetic, electrically insulating recording gap 118, which may have a thickness on the order of 200 nm. The trailing pole-tip 105 is encased with an amagnetic, electrically insulating layer defining a trailing end 138 of head 100. In this embodiment of a merged MR and inductive head, reading of signals is performed by the MR sensor 112, while writing of patterns on the media is performed by magnetic flux spreading out from the gap 118 while travelling between the pole-tips 105 and 115. The width W1 of the trailing pole-tip 105 corresponds to a width of a data track recorded on the medium, and may be more or less than the gap 118 between the pole-tips 105 and 115. Although difficult to depict in this figure, the MR sensor 112 may have a width that is less than W1, and a thickness that is even less.

Figure 3:
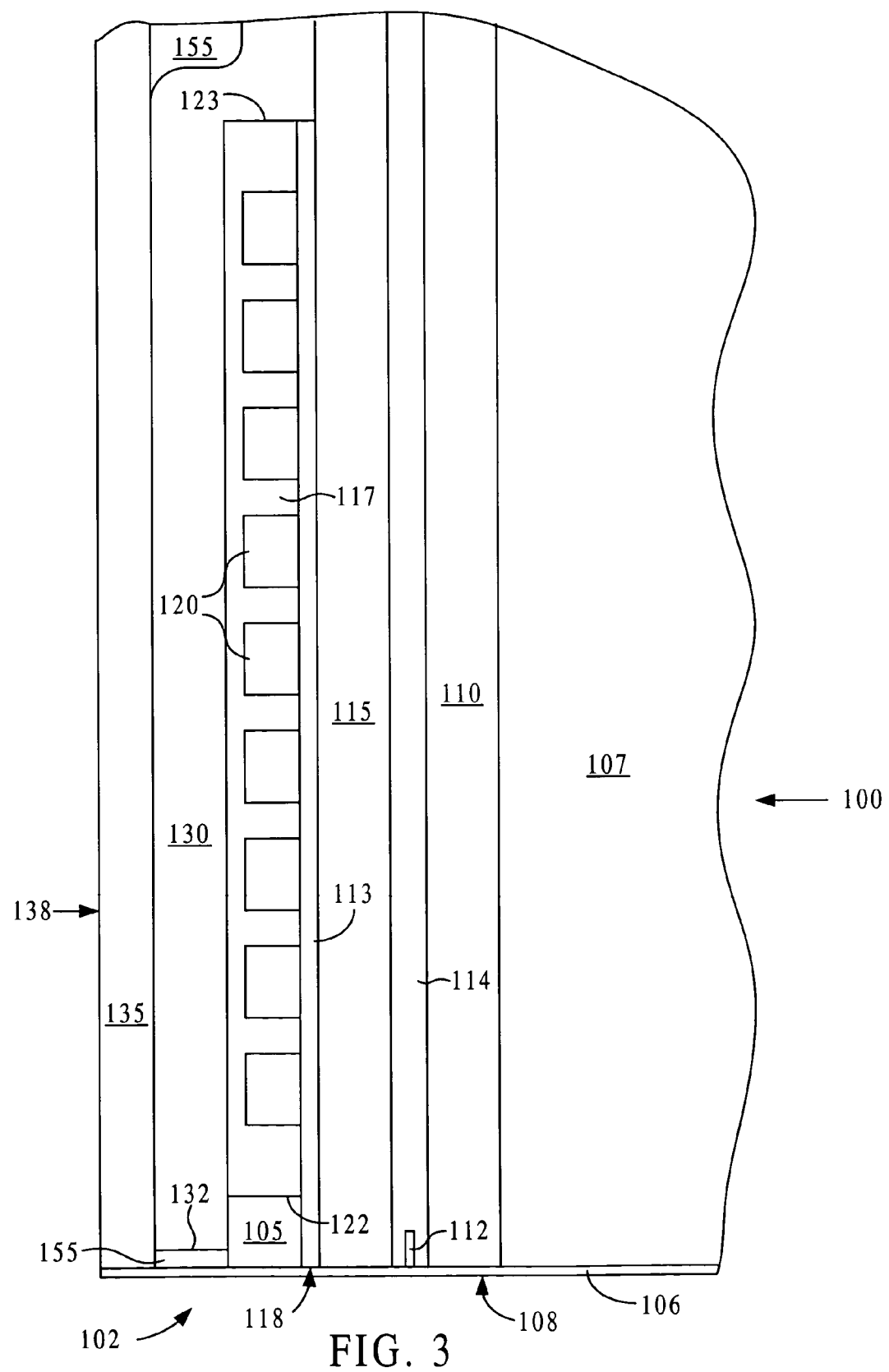
FIG. 3 is a cutaway cross-sectional view of the head of FIG. 2, focusing on the transducer portion of the head.

FIG. 3 is a cutaway cross-sectional view of the head 100 of FIG. 2, focusing on the transducer 102 portion of the head. A protective overcoat 106 made of a form of diamond-like carbon (DLC), such as tetrahedral amorphous carbon (ta-C), or silicon carbide (SiC), or other known materials may be disposed on a media facing surface 108 of the head and evident in FIG. 3, but is substantially transparent and so not shown in FIG. 2. The head 100 is formed on a wafer substrate 107, that may be made of alumina ($Al_2O_3$), alumina titanium carbide ($Al_2O_3$-TiC), silicon (Si), silicon dioxide ($SiO_2$), silicon carbide (SiC) or other known materials, the head being mass-produced along with hundreds or thousands of other heads. In an alternative embodiment, such a head may be formed on a magnetically permeable substrate, such as ferrite, which essentially becomes a first yoke layer. In this embodiment a leading and trailing pole-tip may be formed of high $B_s$ material, and may be formed prior to an optional sensor. It is also possible to form the head on a substrate that is later removed.

After polishing and preparing a surface of the wafer substrate 107, the first magnetically permeable layer 110 is formed of a material such as Permalloy ($Ni_{80}Fe_{20}$), which will function as a magnetic shield. The first shield layer 110 may be formed by first sputtering a seed layer of Permalloy, then masking an area to leave an aperture for the shield to be grown by electroplating, then removing the mask and finally removing the sputtered seed layer not covered by the electroplated layer, as is conventional. A first read gap layer of an amagnetic, electrically insulating material such as Alumina, $SiO_2$ or DLC is then formed, on top of which the magnetoresistive (MR) sensor 112 is formed. The MR sensor 112 may be an anisotropic magnetoresistive (AMR) sensor, spin valve (SV) sensor, giant magnetoresistive (GMR) sensor, or other known sensors, the details of which are known in the art and omitted here for conciseness. One should note, however, that the MR sensor may be composed of a strata of layers having thicknesses ranging between about 4 Å and 100 Å, so that the MR sensor formed by the strata has a thickness less than 500 Å. For clarity, the MR sensor 112 in FIG. 2 is depicted with a similar width as the width W1 of the narrow trailing pole-tip, which may for example be 0.2 μm (2000 Å) or less, but the MR sensor may alternatively have a width that is less than or greater than that of the pole-tip 105. Even for the case in which the MR sensor is trimmed to have a track width of 0.1 μm (1000 Å) or less, that width may still be substantially larger than the thickness of the MR sensor which, as mentioned above, may be less than 500 Å thick. A back gap and a second read gap of electrically insulating, amagnetic materials such as alumina, silicon dioxide or diamond-like carbon are also formed, which combine with the first read gap to form a layer 114 of electrically insulating, amagnetic material encasing MR sensor 112. The first yoke layer 115 of magnetically permeable material such as Permalloy is then formed for transducer 102, layer 115 also serving as a shield for the MR sensor 112 in this embodiment of a merged head. Note that other types of transducers may employ a narrow pole-tip according to the present invention, including piggyback heads, planar heads, heads removed from a substrate, heads having an integrated slider and suspension, heads having an optical sensor, heads with an MR sensor formed after the trailing pole-tip, and inductive heads without an additional sensor. Various types and processes of recording heads are described in Chapter 6 of the $2^{nd}$ Edition of Magnetic Recording Technology, by C. Denis Mee and Eric D. Daniel, pages 6.1–6.102, incorporated herein by reference.

After the above-described conventional steps for making a merged head, the novel pole-tip 105 may be formed either before or after formation of an electrically conductive coil 120 for the transducer 102. An advantage of the present invention is that a narrow pole-tip can be formed somewhat independently of a magnetically permeable yoke that substantially encircles an electrically conductive coil. Note also that describing a magnetically permeable yoke as substantially encircling an electrically conductive coil is meant to represent an inductive transducer, for which the coil may have a single turn or many and which may have a majority of its length not encircled by the yoke. For the case in which the pole-tip 105 is formed after formation of the coil, the pole-tip may be formed prior or subsequent to formation of a second yoke layer for the transducer.

FIG. 3 for example shows an embodiment in which the pole-tip 105 was formed subsequent to the coil 120 but prior to a second yoke layer 130 of magnetically permeable material such as Permalloy. In this case, an amagnetic, electrically insulating layer 113 is first formed that will provide the write gap, and which may provide a surface on top of which the conductive coil 120 is created. The coil may be formed by electroplating copper (Cu), gold (Au) or other conductive materials on a conductive seed layer through a mask that is then removed, after which the seed layer is removed. The coil 120 may then be surrounded by amagnetic, electrically insulating material such as Alumina, which can then be polished to essentially form layer 117 shown in FIG. 3. Layer 117 may then be masked and etched to define edges 122 and 123, and the narrow pole-tip 105 can then be formed adjacent edge 122.

Figure 4:
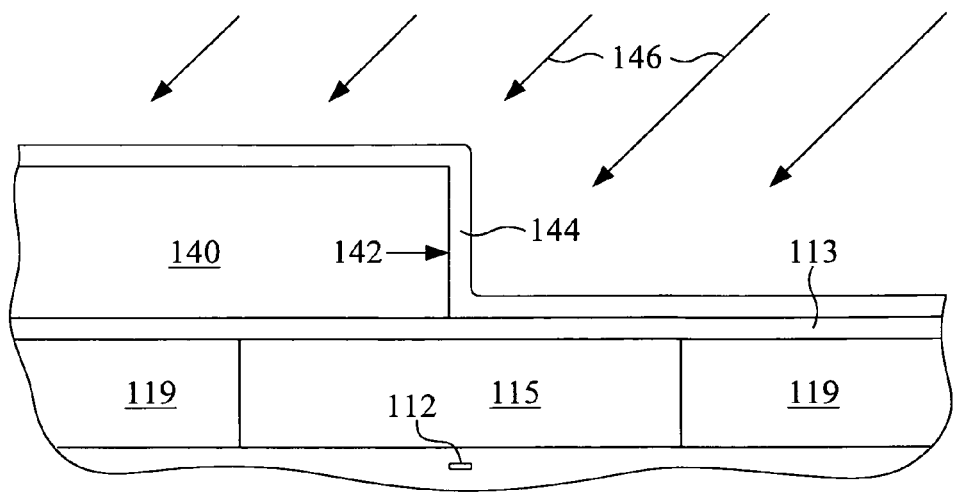
FIG. 4 depicts some steps in the formation of the narrow trailing pole-tip that was shown in FIG. 2 and FIG. 3, viewed along a cross-section located close to what will become the media-facing surface.

FIG. 4 depicts some steps in the formation of the narrow trailing pole-tip 105 that was shown in FIG. 2 and FIG. 3, viewed at a cross-section located close to what will become the media-facing surface. In this view, a layer 119 of amagnetic, electrically insulating material which surrounds yoke layer 115 is apparent, with layers 115 and 119 polished to form a smooth surface for gap layer 113. A base layer 140 is formed on the insulating layer 113, the base layer having a substantially vertical sidewall 142 disposed adjacent the yoke layer 115. The base layer 140 for example may be a photoresist layer that has been developed to create sidewall 142. Alternatively, the base layer 140 may be a ceramic layer or other hard, amagnetic, electrically insulating layer, such as Alumina, $SiO_2$ or $Si_3N_4$, which has been etched, milled or ablated to create sidewall 142.

In FIG. 4 a layer 144 of magnetically permeable material which will form the narrow pole-tip is then grown on the base layer 140, sidewall 142 and the exposed portion of insulating layer 113. The magnetically permeable material layer 144 may be formed in an evacuated chamber from gas, plasma or beams of ions, for example by chemical vapor deposition (CVD), plasma enhanced chemical vapor deposition (PECVD) with or without a collimator, ion beam deposition (IBD) or sputtering (RF or DC), which allows the layer 144 to be as thin as a few nanometers or less in thickness. In general, these different methods of forming the layer 144 result in a structure that is defined as vacuum-deposited. Layer 144 may be formed in the presence of a magnetic field, either during deposition or in a post deposition anneal, that helps to provide an easy axis of magnetization to the magnetic material, for example along the width W1 or length L1 direction of pole-tip 105, shown in FIG. 2. Layer 144 may be formed of Permalloy or materials having a higher $B_s$ than Permalloy.

Sputtering and other vacuum-deposition techniques may provide different material characteristics to the pole-tip than conventional formation by electroplating in a liquid solution. For example, the sputtered layer 144 may be denser than a similar electroplated layer, and is free of residual impurities, such as chlorine, sulfur and carbon-based molecules that may otherwise be left from an electroplating solution. These impurities can promote corrosion of the head and may also degrade magnetic performance characteristics of conventional pole-tips, for example by reducing permeability and $B_s$. Eddy currents can also be reduced with vacuum-deposited pole-tip materials, allowing higher frequency operation. And although Permalloy is easy to electroplate, some materials having a higher $B_s$ than Permalloy may be difficult to form by electroplating, limiting the magnetic performance of conventional pole-tips. In particular, compounds containing refractory metals, such as elements found in columns IVB–VIB of the periodic table (e.g., Zr, Ta and Cr), may be difficult to electroplate but may be formed by sputtering in accordance with the present invention.

Deposition of the magnetically permeable material may occur at an angle from normal to the wafer surface, as shown by arrows 146, covering sidewall 142. The deposition angle may range between zero and about eighty degrees, and may be static or rotating, depending in part whether upon whether the transducers laid out on the wafer surface have identical adjacent structures or mirror-image layouts. For the situation in which the magnetically permeable material is to be formed on oppositely facing sidewalls, the sputtering source may be shut off during rotation of the wafer when neither sidewall is facing the sputtering source. The sputtered layer 144 has a growth morphology that results from growing outward from the base and self-shadowing from the angled deposition. This growth direction can be controlled with process parameters such as sputtering angle, and typically falls in a range between normal to the surface upon which the film is being grown and 70° to that normal. This sputtered structure of layer 144 can be observed with a transmission electron microscope (TEM) and differentiated from an electroplated layer having a similar chemical composition. The growth morphology of the sputtered layer can also help to orient the easy axis of magnetization of layer 144.

Figure 5:
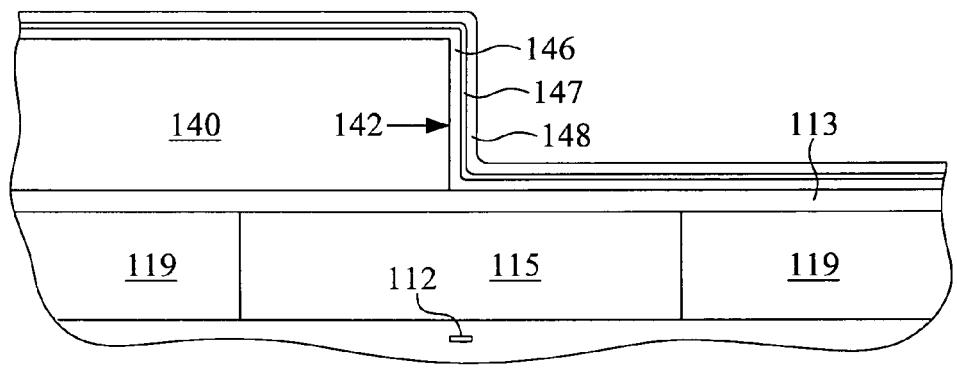
FIG. 5 depicts some steps in the formation of a laminated narrow trailing pole-tip that was shown in FIG. 2 and FIG. 3, viewed along a cross-section located close to what will become the media-facing surface.

FIG. 5 shows a plurality of magnetically permeable layers 146 and 148 formed on base 140 and separated by an amagnetic, electrically insulative layer 147, which may be used for a pole-tip affording extremely high frequency operation without harm from eddy currents. The amagnetic, electrically insulative layer 147 may be formed of Alumina or $SiO_2$, for example, and may be deposited at a similar or different angle than that of one or both of the magnetically permeable layers 146 and 148.

Figure 6:
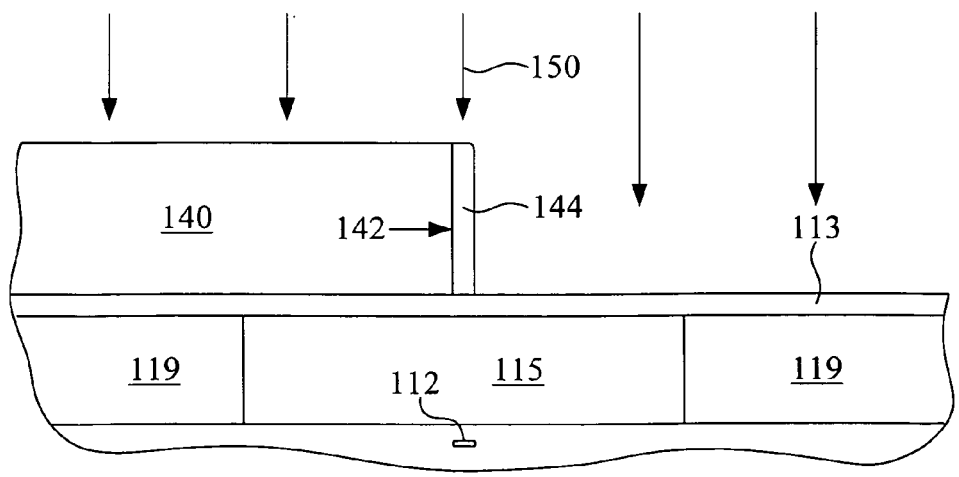
FIG. 6 is a cutaway cross-sectional view of a step in the formation of the head of FIG. 2 and FIG. 3, depicting anisotropic removal of a layer that was deposited in FIG. 4.

FIG. 6 shows that portions of layer 144 that lie atop the base 140 and insulating layer 113 have been removed, for example by ion beam milling or other anisotropic removal as indicated by arrows 150, leaving the vertical portion of layer 144 adjoining sidewall 142. For the example of ion beam etching (IBE), the beam direction 150 should be within about ten degrees from normal to the wafer surface, and may be static or rotating.

Figure 7:
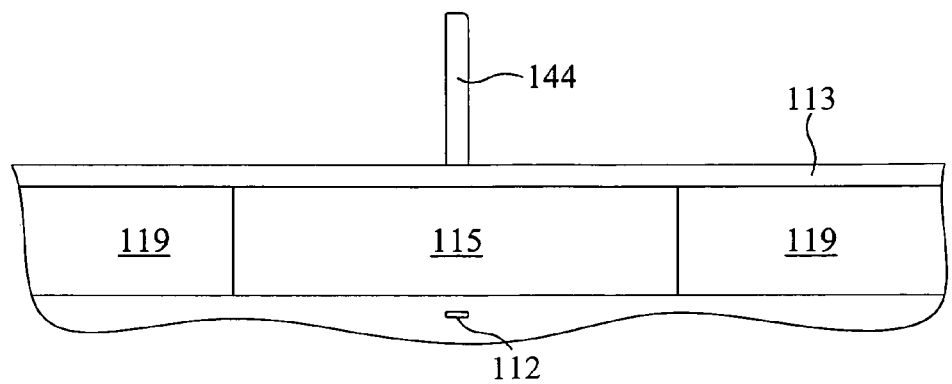
FIG. 7 is a cutaway cross-sectional view of a later step in the formation of the head of FIG. 2 and FIG. 3, depicting selective removal of a base layer to leave a naked magnetic layer.

FIG. 7 depicts an embodiment in which base layer 140 can be selectively removed, such as when the base is formed of photoresist. In this case, chemical or other removal of the base layer can leave the narrow vertical portion of the magnetically permeable material layer 144 standing naked atop the insulating layer 113. The insulating layer 113 is to become the amagnetic gap 118 of FIG. 3, while magnetically permeable layer 144 is to become the narrow pole-tip 105 of FIG. 3, with the novel pole-tip layer oriented substantially perpendicular to the gap layer.

Figure 8:
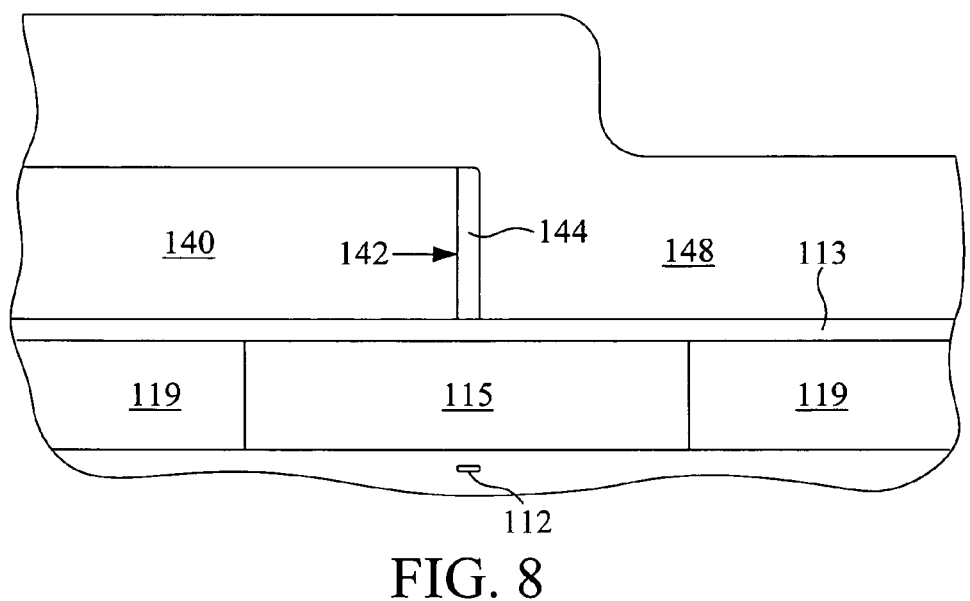
FIG. 8 is a cutaway cross-sectional view of an alternative embodiment of a later step in the formation of the head of FIG. 2 and FIG. 3, in which base layer has been formed of a material that remains intact adjacent the magnetic layer.

FIG. 8 depicts an embodiment in which base layer 140 has been formed of a ceramic layer or other hard, amagnetic, electrically insulating layer, such as Alumina, and remains intact adjacent magnetic layer 144. In this case, a similar hard, amagnetic, electrically insulating layer 148, such as Alumina may be formed on the other side of the perpendicular pole-tip layer 144, encasing that layer 144. The hard layers 144 and 148 are then polished, such as by a chemical-mechanical polish, to form a flat surface, trimming the magnetic layer 144 to form a pole-tip 105, resulting in a structure similar to that shown in FIG. 9.

Figure 9:
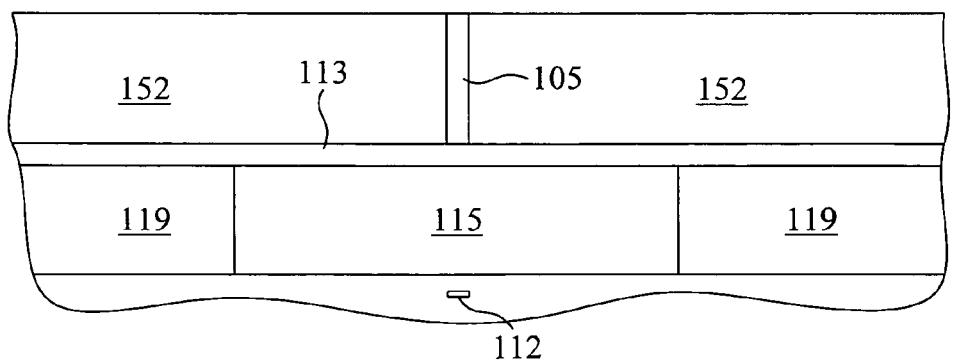
FIG. 9 is a cutaway cross-sectional view of a later step in the formation of the head of FIG. 2 and FIG. 3, depicting encasing the magnetic layer in an amagnetic layer, and planarizing those layers.

FIG. 9 shows that the perpendicular pole-tip layer 144 of FIG. 7 has been surrounded by hard, amagnetic, electrically insulating material that was then planarized, such as by mechanical or chemical-mechanical polishing (CMP), to form a flat surface for layer 152 and to define the length of pole-tip 225. The same planarizing step removes Permalloy that may have formed atop layer 117, and may result in removal of some of layer 117 or a slight thickening of that layer from adding some of layer 152.

Referring again to FIG. 3, atop layer 117 and the exposed pole-tip 105 a second magnetically permeable yoke layer 130 is formed by sputtering and/or electroplating. The mask through which the yoke was formed has an edge 132 that overlaps the pole-tip but does not extend as close to the media-facing surface as the pole-tip. In an alternative embodiment, not shown in this figure, the yoke layer 130 extends as close to the media-facing surface as the pole-tip 105, forming a T-shaped pole-tip when viewed from the media-facing surface. A layer 155 of hard, amagnetic, electrically insulating material such as Alumina or DLC is formed over and around the second yoke layer 130, and after planarization of those layers a small portion of layer 155 is disposed between the yoke layer 130 and the overcoat 106. Another layer 135 of hard, amagnetic, electrically insulating material such as Alumina or DLC is formed atop the planarized second yoke layer 130 and surrounding layer 155, protecting the transducer 102 on a trailing end 138 of the head 100. After dicing the wafer into rows each containing multiple transducers such as transducer 102, the rows are rotated ninety degrees and a protective overcoat 106 is then deposited while forming the media-facing surface 108.

Figure 10:
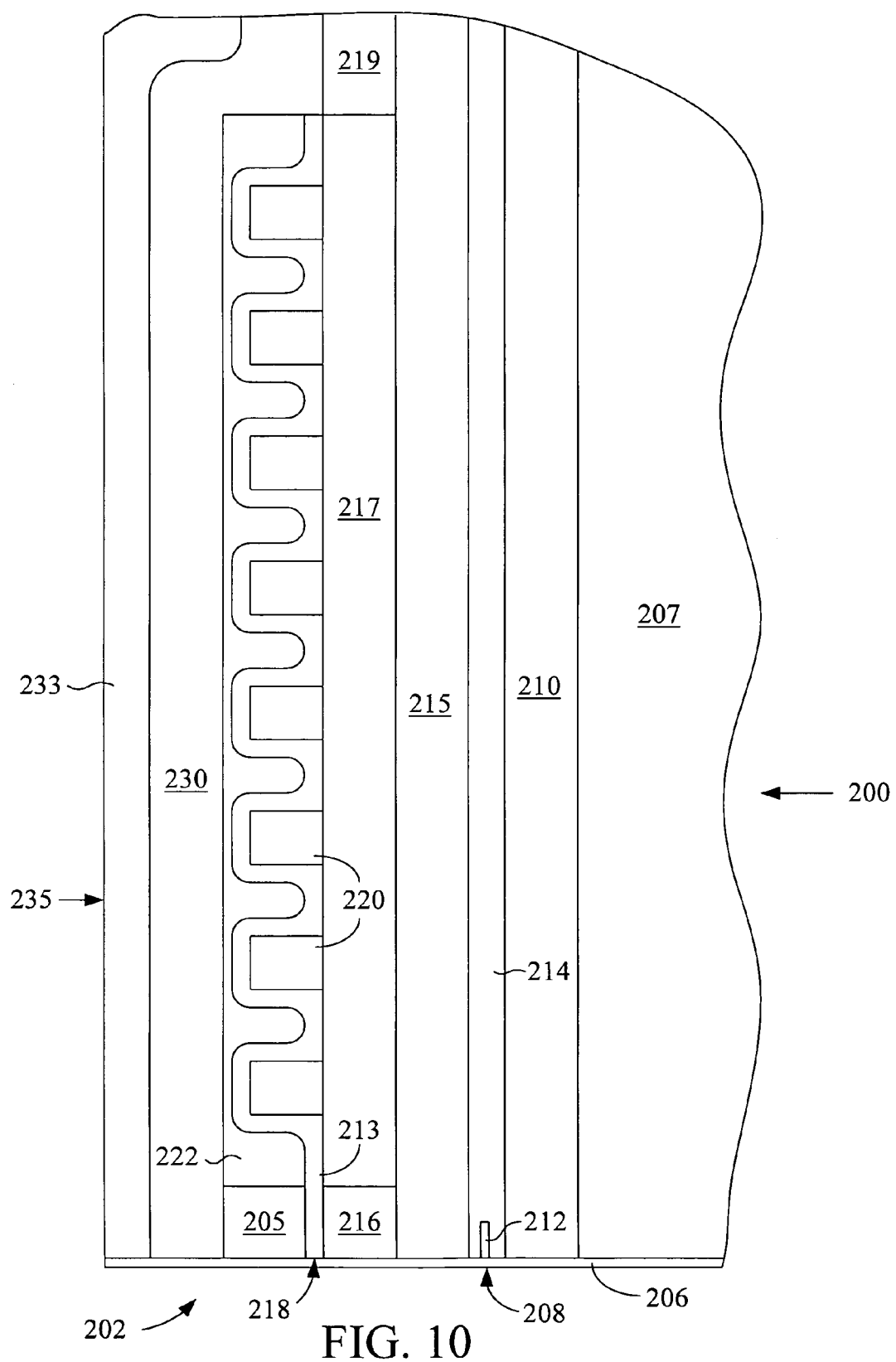
FIG. 10 is a cutaway cross-sectional view of another embodiment of a head in which a narrow trailing pole-tip is formed subsequent to formation of a coil layer but prior to formation of a second yoke layer.

FIG. 10 shows another embodiment of a head 200 in which a trailing pole-tip 205 for a transducer 202 is formed subsequent to formation of a coil layer 220 but prior to formation of a second yoke layer 230. Much as with the prior embodiment, the head 200 includes a substrate 207, first shield layer 210, MR sensor 212 encased in amagnetic, electrically insulating material 214, and a second shield layer 215 that also serves as a first yoke.

Adjoining the first yoke layer 215 in this embodiment, however, a first magnetically permeable pole-tip 216 is formed, surrounded by amagnetic, electrically insulating material 217. This leading pole-tip 216 may be formed by conventional techniques of electroplating through a mask and then ion milling to remove a seed layer and to optionally thin the pedestal. A closure pedestal 219 made of magnetically permeable material may be formed at the same time as the leading pole-tip 216, although it is known that a magnetically permeable loop can be formed by the yokes and pole-tips despite small discontinuities in magnetically permeable material. Pole-tip 216 may help to focus magnetic flux transferred to and from the trailing pole-tip 205. Since the trailing pole-tip 205 provides magnetic flux to the media that can erase prior flux provided by the leading pole-tip 216, the leading pole-tip may be wider than the trailing pole-tip. Alternatively, the leading pole-tip may be formed by overetching of the trailing pole-tip 205 that removes portions of the gap layer 213 and first yoke 215 not covered by trailing pole-tip 205, aligning the pole-tips. For this situation, a first protective coating may first be deposited on the trailing pole-tip before overetching, and a second protective coating deposited on the first yoke 215 after the overetching, to allow removal of possible redeposited magnetic material adjacent the gap, for example with an angular IBE. For an embodiment in which the trailing pole-tip 205 has been made extremely thin in accordance with the present invention, the leading pole-tip 216 may also be formed on a sidewall in a layer aligned with the trailing pole-tip, much as described above with regard to FIGS. 4–9. The closure pedestal 219 may be formed before or after the leading pole-tip 216 for this embodiment. A conductive coil 220 is formed by sputtering, electroplating and ion milling on the surface of the insulating layer 217, and then an amagnetic, electrically insulating layer 213 is formed, which will become the write gap 218.

Figure 11:
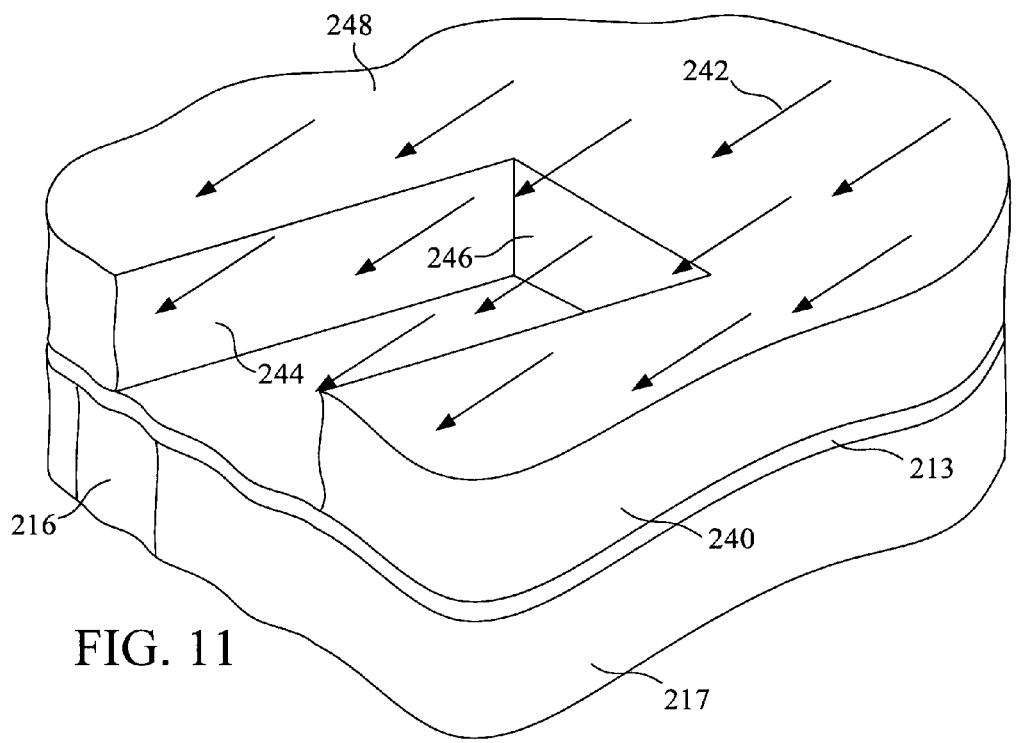
FIG. 11, is a cutaway perspective view of a deposition step in creating the trailing pole-tip of FIG. 10.

FIG. 11 shows a cutaway perspective view of a deposition step in creating the trailing pole-tip 205 of FIG. 10. A photoresist mask layer 240 blankets the amagnetic, electrically insulating layer 213, except for an aperture having a substantially vertical sidewall 244 upon which the pole-tip 205 is to be formed. For clarity, only the layers immediately beneath the insulating layer 213, consisting of the first pole-tip 216 and insulating layer 217, are shown in this figure. A magnetically permeable, high $B_s$ material is sputtered at a static angle depicted by arrows 242, coating wall 244 as well as a major surface 248 of resist layer 240, but avoids a slightly shadowed wall 246 adjacent to coils 220, not shown in this figure. An IBE directed substantially normal to the major surface then removes the magnetically permeable, high $B_s$ material from the photoresist surface and from the surface of layer 213 exposed through the mask, leaving a layer of high $B_s$ material adjoining wall 244, much as shown in FIG. 6. The mask is then removed, leaving an isolated layer of high $B_s$ material that is to form pole-tip 205, similar to that shown in FIG, 7.

Referring again to FIG. 10, the isolated layer of high $B_s$ material is then encased in amagnetic, electrically insulating material 222 and then polished to expose the trailing pole-tip 205 for connection with a second yoke layer 230. The second yoke layer 230 extends to meet the closure pedestal 219 or, in an alternative embodiment not shown in this figure, another closure pedestal may first be formed atop pedestal 219. A protective coating 233 is then formed at a trailing end 235 of head 200. Note that although this embodiment shows the second yoke layer 230 adjoining a protective overcoat that forms a media-facing surface 208, the second yoke layer may instead overlap part of the pole-tip 205 and terminate prior to the overcoat 206, similar to the second yoke shown in FIG. 10.

Figure 12:
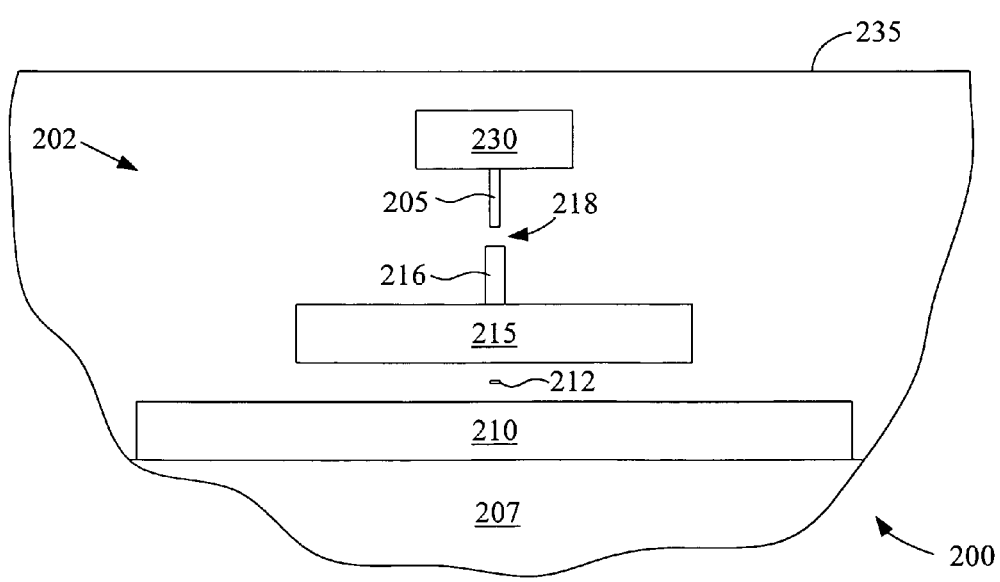
FIG. 12 is a cutaway view of a media-facing side of the head of FIG. 10, focusing on the transducer.

FIG. 12 is a cutaway view of a media-facing side of the head 200 of FIG. 10 focusing on the transducer 202. The first yoke 215 and leading pole-tip 216 form a T-shaped structure, as do the second yoke 230 and trailing pole-tip 205, separated by the write gap 218. A leading end of the head is not shown in this figure for clarity but is located opposite the trailing end 235, and generally encounters a portion of media passing adjacent the head immediately prior to the media portion passing by the remainder of the head, with the media portion last encountering the trailing end before moving away from the head.

Figure 13:
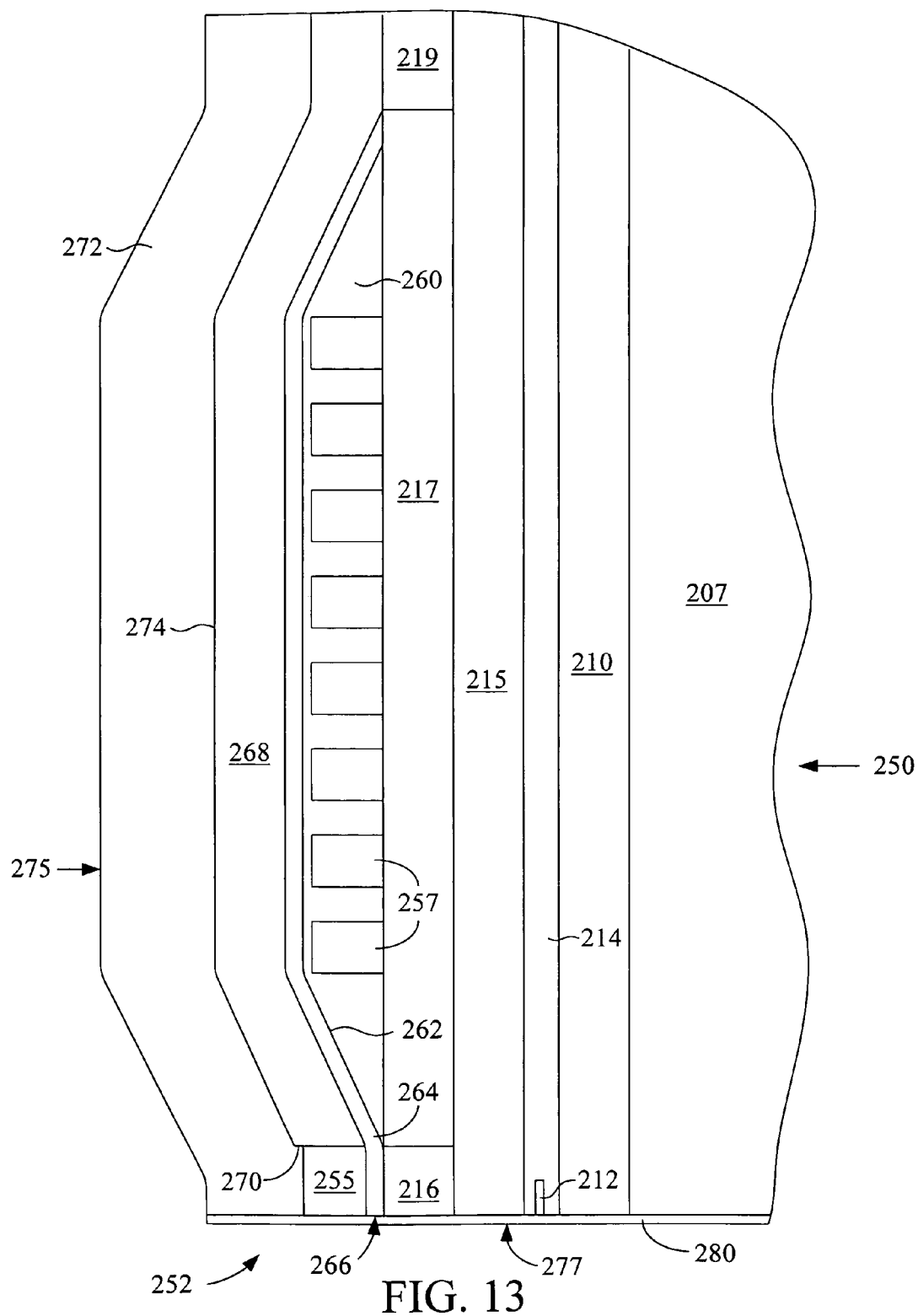
FIG. 13 is a cutaway cross-sectional view of an embodiment of a head like that of FIG. 10 but having a trailing pole-tip formed subsequent to formation of a second yoke layer.

FIG. 13 shows an embodiment of a head 250 that is formed much as described regarding FIG. 10 prior to the formation of a conductive coil, and so is not renumbered for like elements. For a transducer 252 of FIG. 13, however, a trailing pole-tip 255 is formed subsequent to formation of a second yoke layer 268. For this embodiment, a coil 257 is formed on the surface of amagnetic, electrically insulating layer 217 that was described with regard to FIG. 10. Another amagnetic, electrically insulating layer 260 such as photoresist is then formed on and around the coil 257, and reflowed to create a sloping side 262 adjacent the pole-tip 255. Yet another amagnetic, electrically insulating layer 264 is then formed which will provide the write gap 266. A second yoke 268 may then formed by sputtering a film of Permalloy, masking an area to leave an aperture for the yoke to be grown by electroplating, removing the mask and then removing the sputtered film not covered by the electroplated layer. The mask creates an edge 270 to the yoke adjacent to where the trailing pole-tip 255 is to be formed. The pole-tip is then created much as described above with respect to FIGS. 4–9, and then encased in a protective layer 272 of amagnetic, electrically insulating material along a trailing end 275 of the head 250. In the embodiment of FIG. 12 the base layer upon which the pole-tip is formed may be made of a resist that is spun so that it does not cover a plateau 274 of the second yoke 268, and the high $B_s$ material that forms the pole-tip may be deposited at an angle that avoids shadowing by edge 270. After the head has been diced from other heads on the wafer substrate 207, another protective overcoat 277 is formed on a media-facing surface 280.

Figure 14:
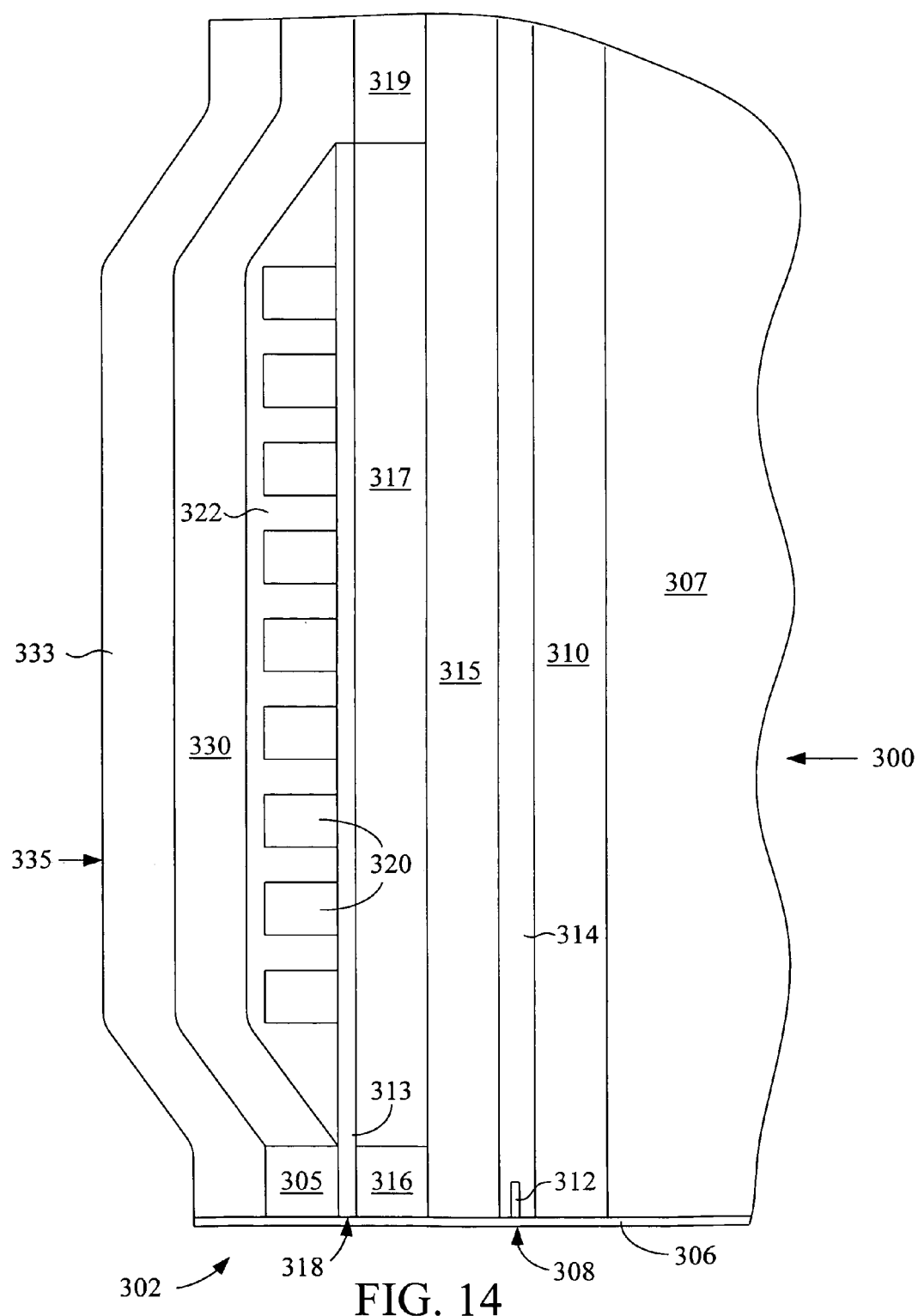
FIG. 14 is a cutaway cross-sectional view of an embodiment of a head like that of FIG. 13 but having a narrow trailing pole-tip that is formed prior to formation of a coil layer.

FIG. 14 depicts a head 300 including a transducer having a narrow trailing pole-tip 305 that is formed prior to forming a coil layer 320. Like previously described embodiments, head 300 includes a wafer substrate 307, a first magnetically permeable shield layer 310, a MR sensor 312 encased in an amagnetic, electrically insulating layer 314 and a second shield that also functions as a first yoke layer 315. On the first yoke layer 315 a leading pole-tip 316 and a closure pedestal 319 are formed of magnetically permeable material such as Permalloy, the pole-tip and pedestal separated by an amagnetic, electrically insulating layer 317. After polishing the pole-tip 316, pedestal 319 and insulating layer 317, an amagnetic, electrically insulating layer 313 of material such as alumina, silicon dioxide or diamond-like carbon is formed, creating a recording or write gap 318 between the pole-tips 305 and 316. Atop the amagnetic layer 313 adjacent the write gap the narrow, magnetically permeable trailing pole-tip 305 may be formed as described previously with regard to FIGS. 4–9 or FIG. 11, or as shown in FIG. 15 and described below.

Figure 15:
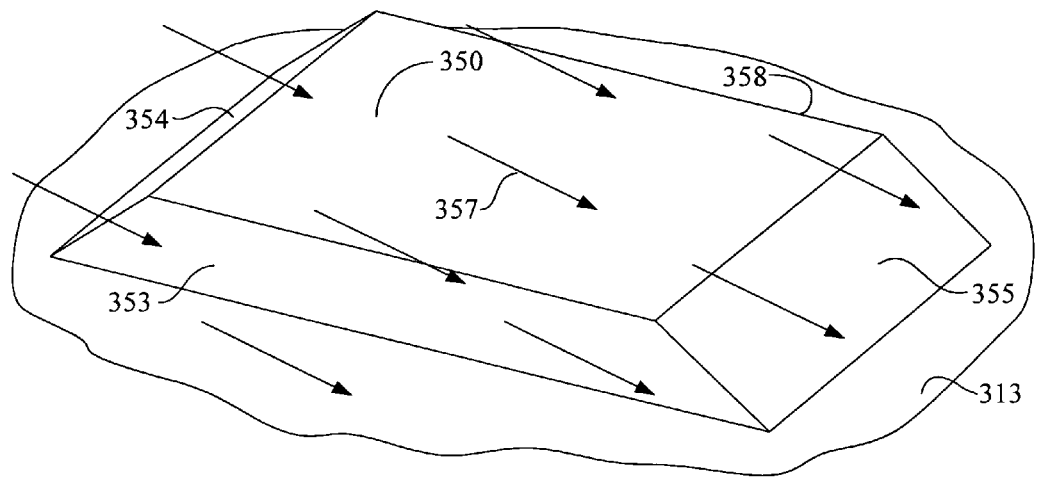
FIG. 15 is a cutaway perspective view of a base that serves as a template for creating the narrow, magnetically permeable trailing pole-tip.

FIG. 15 is a cutaway perspective view of a base 350 that serves as a template for creating the narrow, magnetically permeable trailing pole-tip, the base disposed atop amagnetic layer 313. The base 350 in this embodiment is a raised plateau that may be formed for example of photoresist that has been developed to have a pair of substantially vertical sides 353 and 358, and a pair of sloping sides 354 and 355. The substantially vertical side 353 may be an edge upon which the trailing pole-tip is deposited, and for an embodiment in which transducers are formed on the wafer surface in mirror-image patterns, an oppositely disposed, substantially vertical side 358 may be an edge upon which another trailing pole-tip is deposited. The sloping sides 354 and 355 may be created with a developing mask that transmits a graded intensity of light during development, such as a mask having opaque bars that vary in spacing or width. A magnetically permeable, high $B_s$ material may be sputtered on the base 350 at an angle from normal to the wafer surface, as shown by arrows 357, covering sides 353 and 354. The deposition angle may range between zero and about eighty degrees, and may be static or rotating, depending in part whether upon whether the transducers laid out on the wafer surface have identical adjacent structures or mirror-image layouts. For the case in which the sputtering angle rotates, sides 355 and 358 are also covered with the magnetically permeable material.

Figure 16:
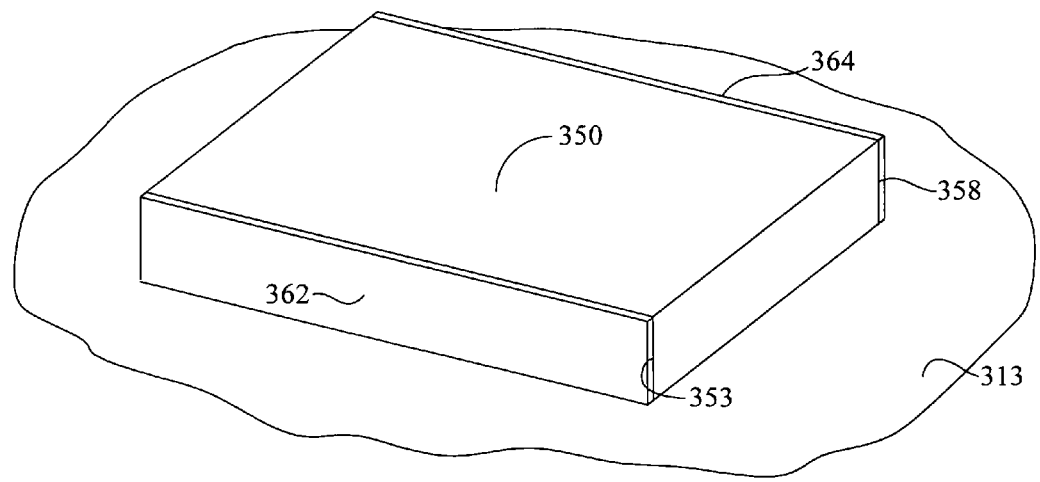
FIG. 16 is a cutaway perspective view of the base of FIG. 15 after an anisotropic removal process that leaves substantially vertical magnetic layers.

As shown in FIG. 16, a subsequent anisotropic removal process, such as a substantially vertical IBE, can remove the magnetically permeable material from sides 354 and 355 without significantly thinning layers 362 and 364 of the material deposited on sides 353 and 358, respectively. Layers 362 and 364 may then become trailing pole-tips for adjacent transducers being formed on a wafer surface.

Referring again to FIG. 14, after formation of the narrow trailing pole-tip 305, which is then encased in protective material such as photoresist, the conductive coil layer 320 may be formed by electroplating through a mask atop a conductive seed layer, with the seed layer then removed from between the coils. An amagnetic, electrically insulating layer 322 is then formed surrounding the coils 320, and may be reflowed to create a sloping side adjacent the pole-tip 305. A second yoke layer 330 is then formed by depositing a seed layer, then electroplating through a mask and then removing the seed layer not covered by the electroplated yoke. A protective layer 333 is then formed on what will become a trailing end 335 for the head 300. The wafer is then diced and a protective coating 306 may be formed on what will become a media-facing surface 308 for the head.

Figure 17:
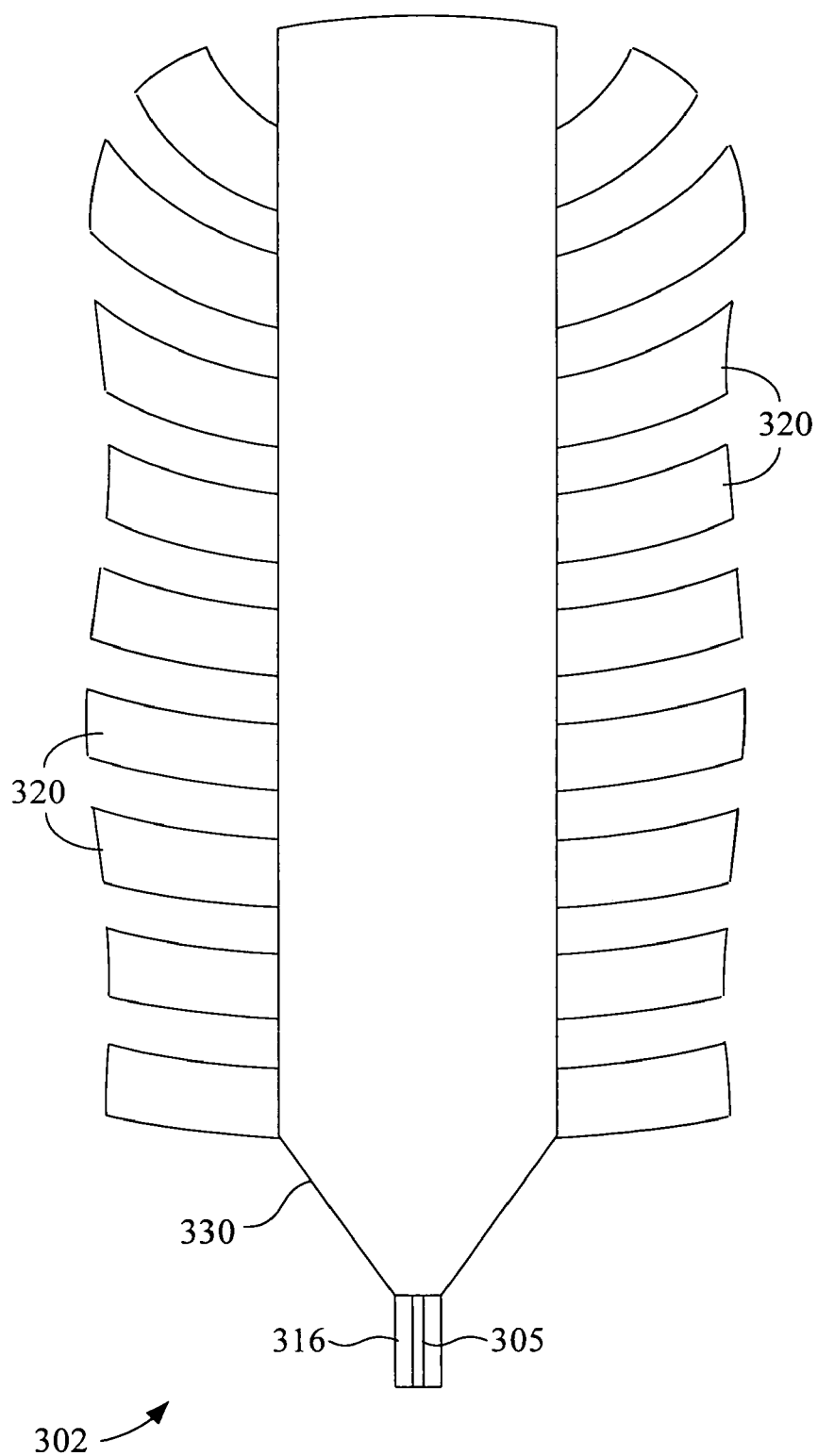
FIG. 17 is a schematic view of the transducer of FIG. 14 from the trailing end, showing the coils and the second yoke, which tapers to adjoin the narrow trailing pole-tip.

FIG. 17 shows a view of the transducer 302 from the trailing end, which for clarity only shows the active components formed over the amagnetic layer 313. The coils 320 wind around between the amagnetic layer 313 and the second yoke 330, which tapers to adjoin the narrow trailing pole-tip 305.

Figure 18:
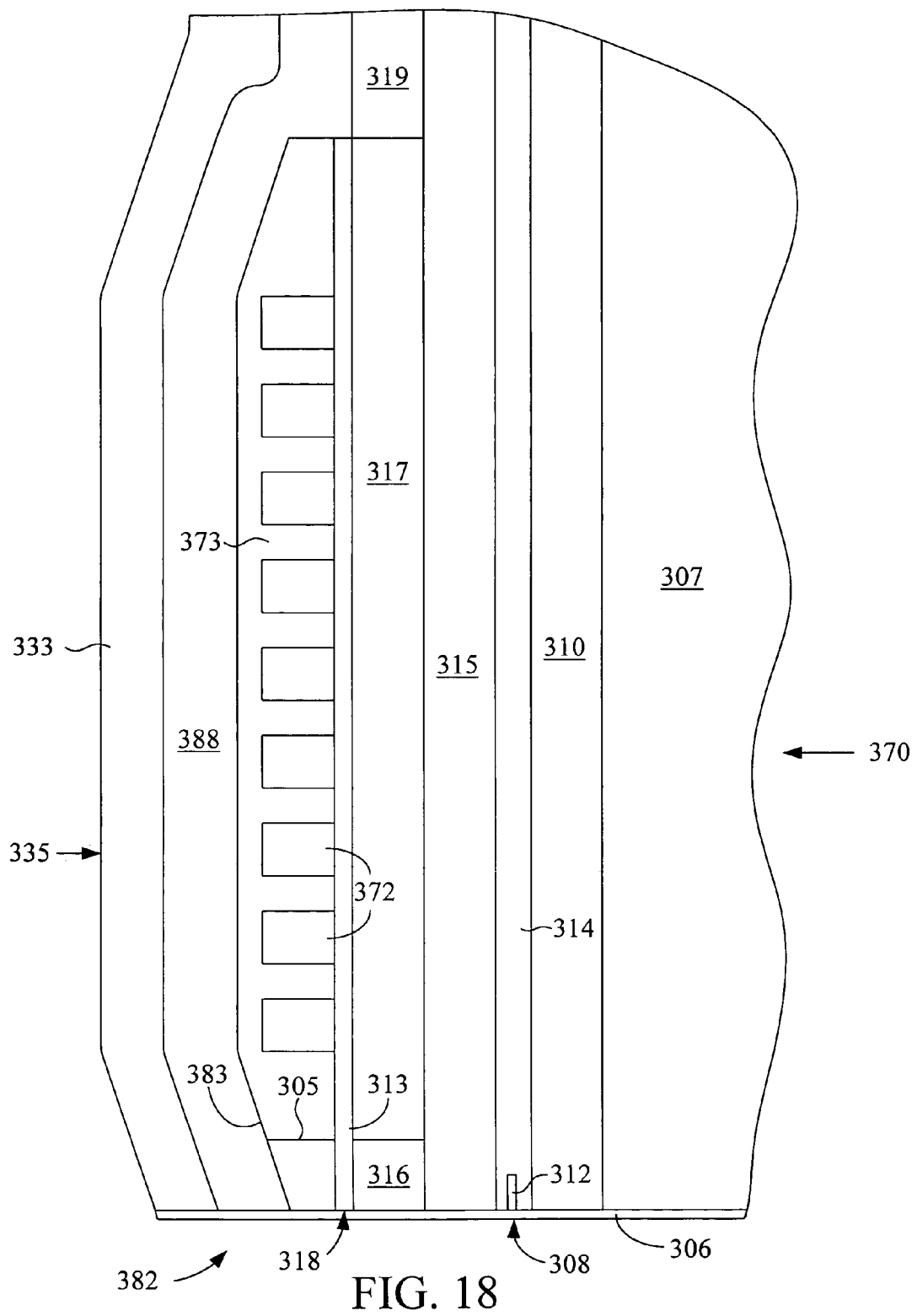
FIG. 18 is a cutaway cross-sectional view of an embodiment of a head like that of FIG. 14 but having a sloping side of a second yoke adjoining the pole-tip.

FIG. 18 shows an embodiment of a head 370 that is formed like that described regarding FIG. 14 prior to surrounding a conductive coil 372 with an amagnetic, electrically insulating material 373, and so is not renumbered for like elements. For a transducer 382 of FIG. 18, however, the amagnetic, electrically insulating layer 373 may be reflowed to cover most of the trailing pole-tip 305, creating a sloping side 383 adjacent the pole-tip 305 while leaving that pole-tip partially exposed. A second yoke 388 is then electroplated that covers the exposed portion of the pole-tip, the yoke tapered and sloping to provide a maximum flux intensity adjacent the write gap 318.

Figure 19:
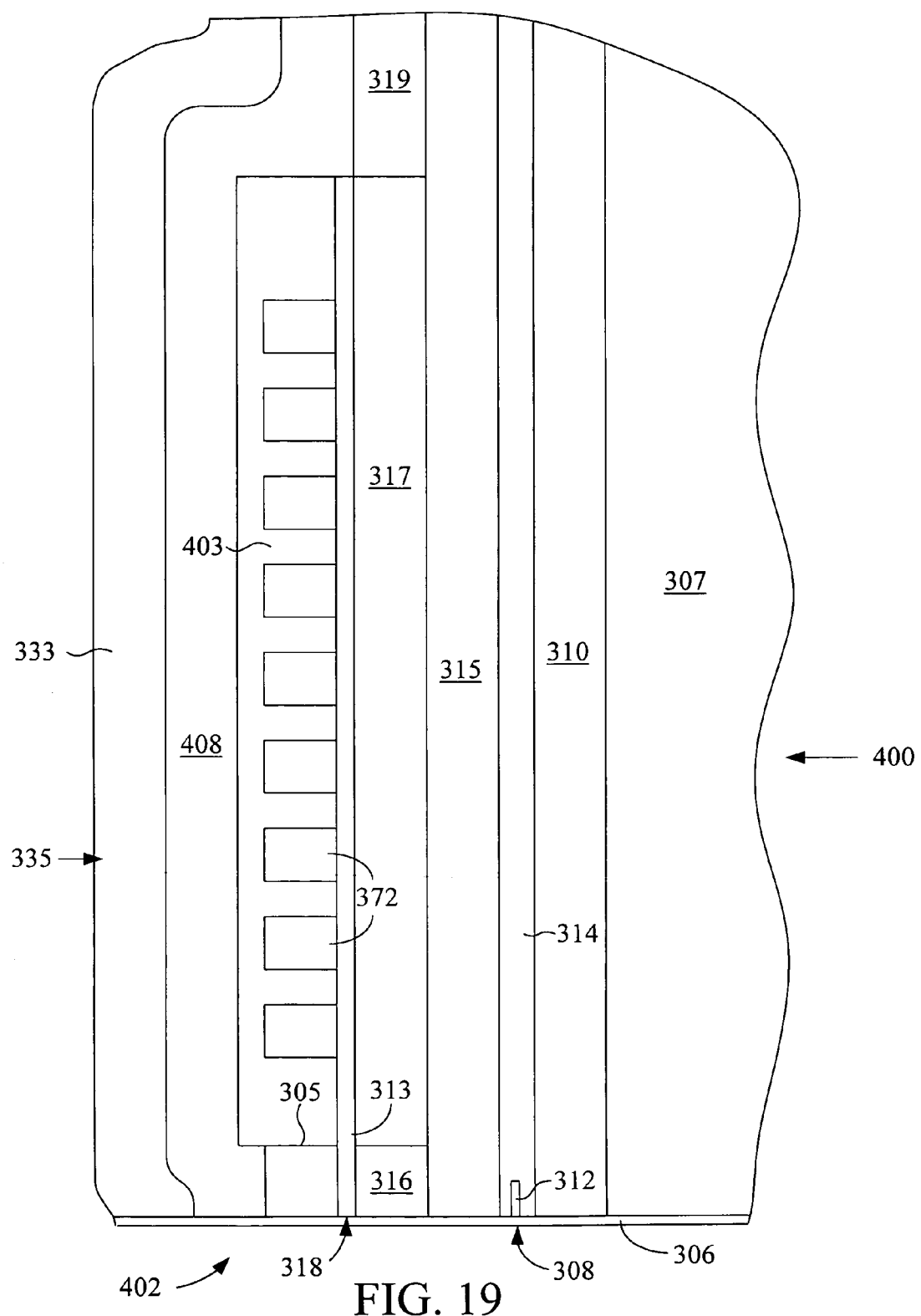
FIG. 19 is a cutaway cross-sectional view of an embodiment of a head like that of FIG. 18 but having a level side of a second yoke adjoining the pole-tip distal to a write gap.

FIG. 19 shows an embodiment of a head 400 that is formed like that described regarding FIG. 18 prior to surrounding the conductive coil 372 with an amagnetic, electrically insulating material 403, and so is not renumbered for like elements. For a transducer 402 of FIG. 19, however, the pole-tip 305 is encased in an amagnetic, electrically insulating material, not shown in this cross-sectional view, leaving a surface of the pole-tip exposed distal to the gap 318. An amagnetic, electrically insulating layer 403 such as photoresist is then formed, surrounding and covering the coil layer 372 and exposed surface of pole-tip 305. The part of layer 403 covering the pole-tip 305 and closure pedestal 319 is then removed, and a second yoke 408 is then electroplated that covers the exposed portion of the pole-tip 305 and pedestal 319. In an alternative embodiment the second yoke 408 terminates further from the media-facing surface 308 than does the trailing pole-tip 305.

Figure 20:
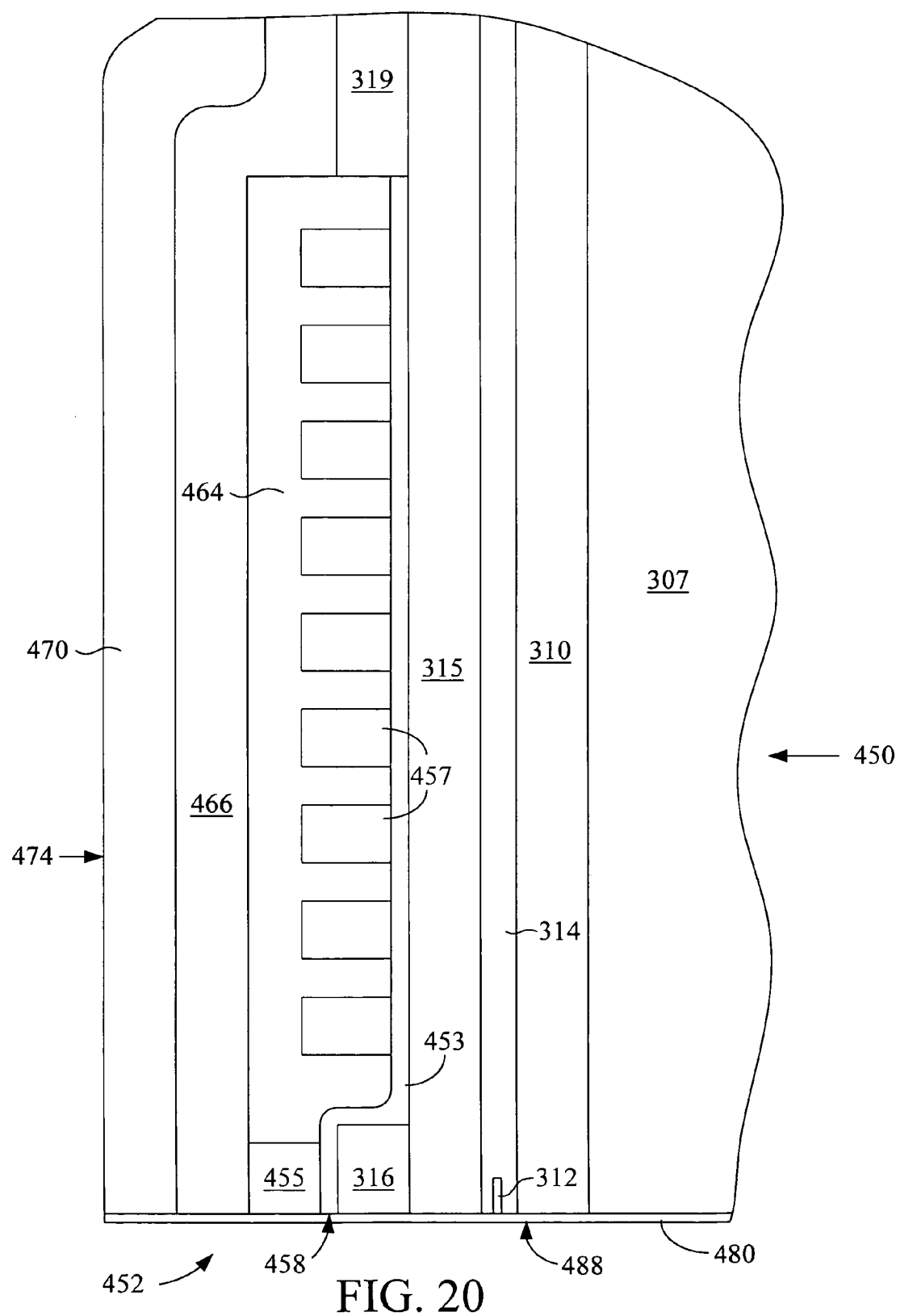
FIG. 20 is a cutaway cross-sectional view of an embodiment of a head like that of FIG. 19 but having a flat second yoke adjoining the pole-tip distal to a write gap.

FIG. 20 shows an embodiment of a head 450 with a transducer 452 that is formed like that described regarding FIG. 20 up to forming the leading pedestal 316 and closure pedestal 319. An amagnetic, electrically insulating layer 453 is then formed that is to provide a write gap 458. A trailing pole-tip 455 is then formed as described with regard to FIGS. 4–9, FIG. 11 or FIG. 15. A conductive coil 457 is then formed, and then surrounded with an amagnetic, electrically insulating material 464 that also covers the trailing pole-tip 455. The insulating material 464 is then planarized to expose the trailing pole-tip 455 and trimmed to expose closure pedestal 319. A second magnetically permeable yoke 466 is then formed atop the insulating layer 464, the pole-tip 455 and the pedestal 319. In an alternative embodiment the coil layer may be made thinner so that the second yoke layer 466 can be essentially coplanar with the pole-tip 455, adjoining the pole-tip distal to a media-facing surface 488 rather than adjoining the pole-tip distal to the gap layer 453. A protective coating 470 is then formed on a trailing end 474 of the head. After separating the head 450 from other heads of the wafer substrate 307, another protective coating 480 may be formed on the media-facing surface 488.

Figure 21:
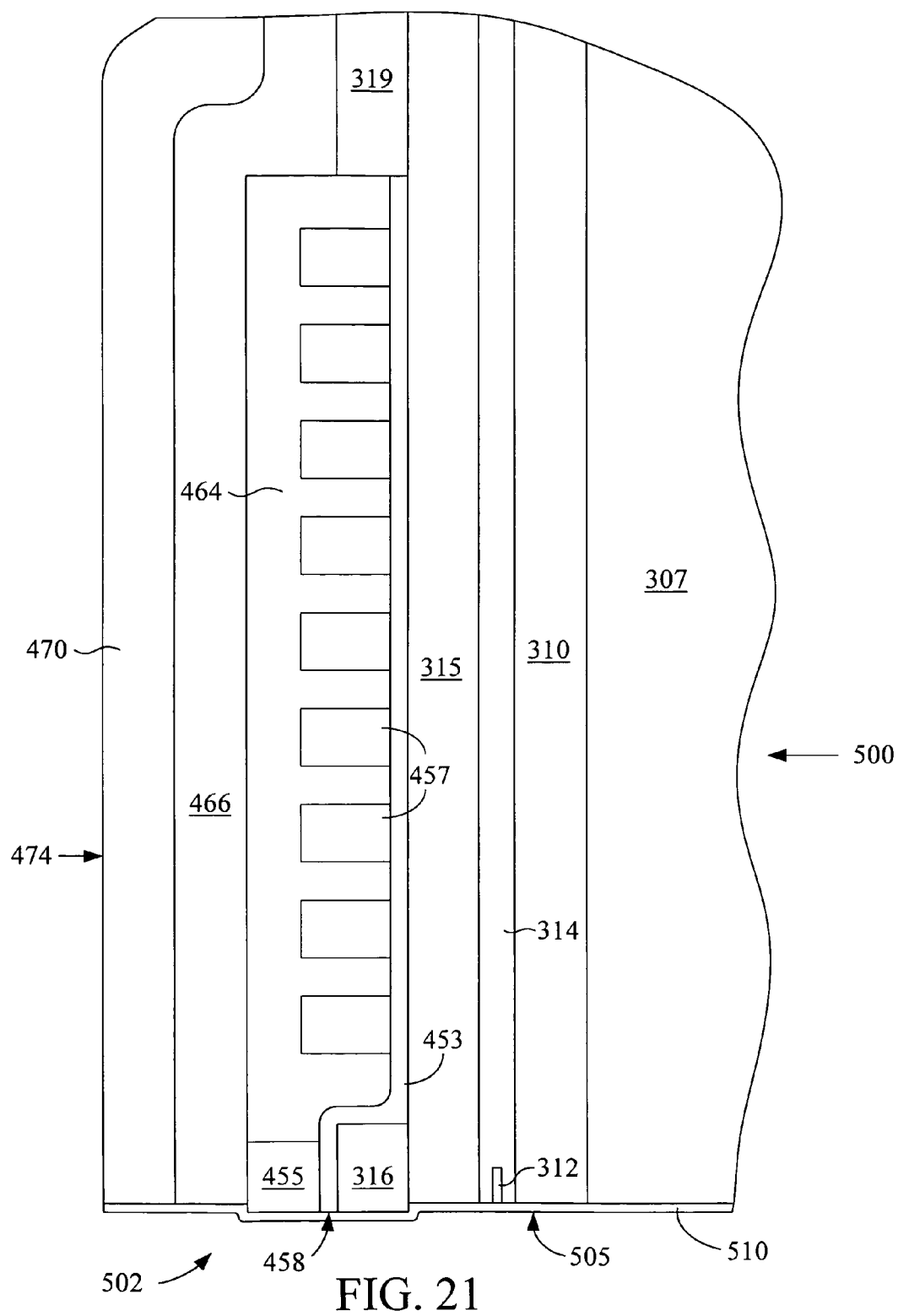
FIG. 21 is a cutaway cross-sectional view of an embodiment of a head like that of FIG. 20 but having a relieved media-facing surface with pole-tips that project slightly compared to the yokes and MR sensor.

FIG. 21 shows a head 500 like that of FIG. 20, except that a media-facing surface 505 has been relieved so that pole-tips 316 and 455 protrude compared to yokes 315 and 466, shield 310 and MR sensor 312. This relative protrusion of the pole-tips 316 and 455 decreases fringe fields of the yokes 315 and 466 that may otherwise be felt by a media with which the head communicates. Recession of the MR sensor 312 relative to the pole-tips helps to avoid damage to the MR sensor and false signals from thermal asperities that may otherwise be caused by high-speed contact with the media. The protrusion of the pole-tips 316 and 455 relative to the yokes 315 and 466 and MR sensor 312 may range between about 40 Å and 0.1 µm, and may be different amounts for the first yoke 315, second yoke 466 and MR sensor 312. Relieving of the media-facing surface 505 may occur after the head 500 has been diced into rows and rotated to form an air-bearing or media-contacting surface. After relieving the media-facing surface 505 a protective overcoat 510 may be applied to some or all of that surface. This approach may be used with any of the above-described heads, as well as other embodiments not listed above.

Figure 22:
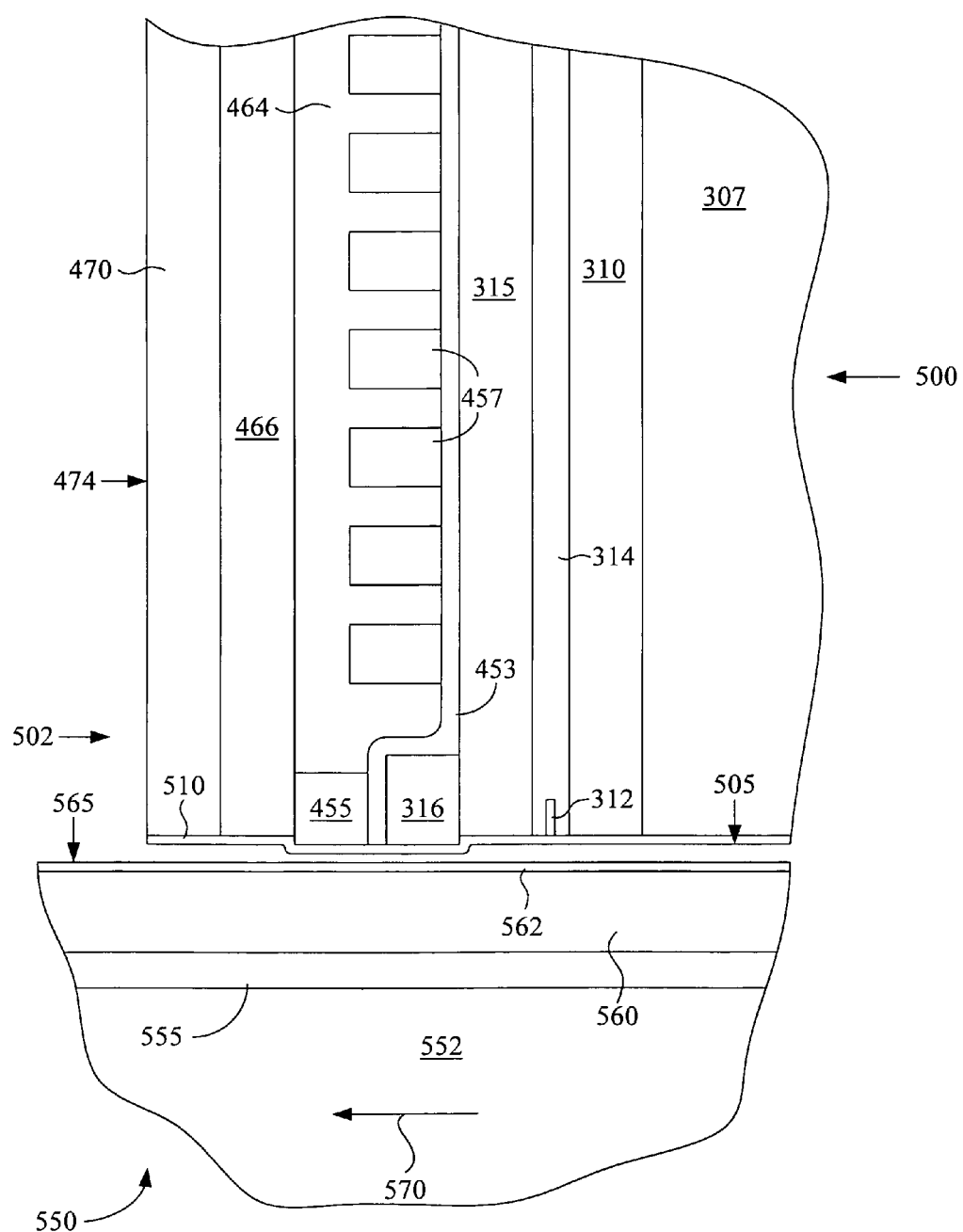
FIG. 22 is a cutaway cross-sectional view of the head of FIG. 20 interacting with a media such as a rigid magnetic disk.

FIG. 22 shows the head 500 of FIG. 21 interacting with a media 550, such as a rigid or flexible magnetic disk or tape, or magneto-optical disk or tape for the case in which the head has an optical rather than an MR sensor. For the case in which the media 550 is a rigid disk, a wafer substrate 552 is shown that may be made of glass, SiC, aluminum, or any of a number of other materials known in the art. The substrate may or may not be roughened or patterned, as is known in the art, and is covered with an underlayer 555 that may provide adhesion and a desired structure for a media layer 560 formed on the underlayer. The media layer 560 may be a conventional cobalt (Co) based alloy, which may include elements such as chromium (Cr), platinum (Pt) and tantalum (Ta), for instance. Although a single media layer 560 is shown for conciseness, layer 560 may actually represent several layers as is known, and may be designed for longitudinal or perpendicular data storage. The underlayer 555 may include Cr, nickel aluminum (NiAl), magnesium oxide (MgO) or other materials known in the art, and may be formed of more than one layer. Atop the media layer 560 a thin layer 562 of DLC, ta-C, or SiC is formed, creating a dense, hard surface 565 for the disk 550. The layer 562 may have a thickness in a range between about 8 Å to 100 Å, similar to that of head overcoat layer 510.

The disk 550 is moving relative to the head 500 in a direction shown by arrow 570, while the head may be positioned over a single concentric data track of the disk or may be sweeping across the disk in a direction into or out of the paper of this cross-sectional drawing. The disk may be rotating at various speeds known in the art, so that the relative speed in the direction of arrow 570 may range between a few meters per second and well over ten meters per second. A layer of air or other ambient gas accompanies the rapidly spinning disk surface 565 and interacts with the media-facing surface 505 of the head 500, causing the head in this embodiment to levitate slightly from the disk. In other embodiments, the head may be designed to operate in occasional, frequent or continuous physical contact with the disk. The head surface 505 is separated from the disk surface 565 by a physical spacing that may range between several hundred angstroms and zero, with a preferred spacing of between about two hundred angstroms and about thirty angstroms. A lubricant including perfluorocarbon molecules or other known materials may be distributed on the disk surface 565 beneath the head.

Although we have focused on teaching the preferred embodiments of a novel narrow pole-tip, other embodiments and modifications of this invention will be apparent to persons of ordinary skill in the art in view of these teachings. Therefore, this invention is limited only by the following claims, which include all such embodiments and modifications when viewed in conjunction with the above specification and accompanying drawings.

The invention claimed is:

1. A transducer comprising:
a plurality of solid layers, including a magnetically soft loop substantially encircling an electrically conductive coil section and terminating in lead and trailing magnetically soft layers separated by an amagnetic gap layer, said trailing magnetically soft layer being oriented substantially perpendicular to said amagnetic layer, wherein said trailing magnetically soft layer has a width measured in a direction substantially parallel to said amagnetic layer, said width being less than about two hundred nanometers and greater than about twenty angstroms;
wherein said trailing magnetically soft layer has a length measured in a direction substantially perpendicular to said amagnetic layer, with said length being at least six times greater than said width.

2. The transducer of claim 1, wherein a distance between said magnetically soft layers is not substantially greater than said width.

3. The transducer of claim 1, wherein said trailing magnetically soft layer contains a refractory metal.

4. The transducer of claim 1, wherein said trailing magnetically soft layer contains material having a $B_s$ higher than that of Permalloy.

5. The transducer of claim 1, wherein said leading magnetically soft layer is substantially perpendicular to said trailing magnetically soft layer.

6. The transducer of claim 1, wherein said leading magnetically soft layer contains vacuum-deposited material.

7. The transducer of claim 1, further comprising a magnetoresistive sensor layer disposed adjacent said leading magnetically soft layer and oriented substantially perpendicular to said trailing magnetically soft layer.

8. The transducer of claim 1, wherein said magnetically soft loop includes a magnetically soft trailing yoke layer that adjoins said trailing magnetically soft layer.

9. The transducer of claim 8, wherein said trailing yoke layer extends further in said direction substantially parallel to said amagnetic layer than in a direction substantially perpendicular to said amagnetic layer and aligned with said leading and trailing magnetically soft layers.

10. The transducer of claim 1, wherein said trailing magnetically soft layer is laminated.

11. A transducer for an information storage system, the transducer comprising:
a plurality of solid layers, including a magnetoresistive sensor layer and a magnetically soft loop substantially encircling an electrically conductive coil section and terminating adjacent a media-facing surface in leading and trailing magnetically soft layers separated by an amagnetic gap layer, said trailing magnetically soft layer being oriented substantially perpendicular to said magnetoresistive sensor layer and having a width measured in a direction substantially parallel to said magnetoresistive sensor layer, said width being less than about two hundred nanometers and greater than about twenty angstroms;
wherein said trailing magnetically soft layer has a length measured in a direction substantially perpendicular to said magnetoresistive sensor layer, with said length being at least six times greater than said width.

12. The transducer of claim 11, wherein said trailing magnetically soft layer is substantially perpendicular to said amagnetic layer.

13. The transducer of claim 11, wherein said trailing magnetically soft layer is substantially perpendicular to said leading magnetically soft layer.

14. The transducer of claim 11, wherein said trailing magnetic soft layer is laminated.

15. The transducer of claim 11, wherein said width of said trailing magnetically soft layer is not substantially greater than a thickness of said amagnetic layer.

16. The transducer of claim 11, wherein said trailing magnetically soft layer contains material having a $B_s$ higher than that of Permalloy.

17. The transducer of claim 11, wherein said trailing magnetically soft layer contains a refractory metal.

18. The transducer of claim 11, wherein said trailing magnetically soft layer is sputter-deposited.

19. The transducer of claim 11, wherein said leading magnetically soft layer is sputter-deposited.

20. The transducer of claim 11, wherein said magnetically soft loop includes a magnetically soft trailing yoke layer that adjoins said trailing magnetically soft layer.

21. The transducer of claim 20, wherein said trailing yoke layer extends further in said direction substantially parallel to said magnetoresistive sensor layer than in a direction substantially perpendicular to said magnetoresistive sensor layer and aligned with said leading and trailing magnetically soft layers.

22. A transducer comprising:
a magnetoresistive sensor layer,
a magnetically soft loop disposed adjacent to said magnetoresistive sensor layer, traversed by an electrically conductive coil section and including magnetically soft leading and trailing pole-tips disposed adjacent to a media-facing surface, said trailing pole-tip aligned with said magnetoresistive sensor layer along a longitudinal direction and having a width measured in a track-width direction that is perpendicular to said longitudinal direction, said longitudinal and track-width directions being substantially parallel to said media-facing surface, said width being less than two hundred nanometers and greater than twenty angstroms;
wherein said trailing pole-tip has a length measured in said longitudinal direction, said length being at least five times greater than said width.

23. The transducer of claim 22, wherein said leading and trailing pole-tips are separated by a submicron nonferromagnetic gap layer.

24. The transducer of claim 22, wherein said trailing pole-tip consists essentially of sputtered material.

25. The transducer of claim 22, wherein said trailing pole-tip contains material having a $B_s$ higher than that of Permalloy.

26. The transducer of claim 22, wherein said leading magnetically soft loop includes a magnetically soft yoke layer adjoining said trailing pole-tip.

27. The transducer of claim 26, wherein said yoke layer extends further in said track-width direction than in said longitudinal direction.

28. The transducer of claim 22, wherein said trailing pole-tip is laminated.

29. A disk drive comprising:
a rigid magnetic disk, and
a magnetic head disposed adjacent to the disk, the head including a magnetically soft loop substantially encircling an electrically conductive coil section and terminating in leading and trailing magnetically soft layers separated by an amagnetic gap layer, one of said magnetically soft layers being oriented substantially perpendicular to said amagnetic layer, wherein said one magnetically soft layer has a width measured in a direction substantially parallel to said amagnetic layer, said width being less than about two hundred nanometers and greater than about twenty angstroms;
wherein said trailing magnetically soft layer has a length measured in a direction substantially perpendicular to said amagnetic layer, said length being at least six times greater than said width.

30. The disk drive of claim 29, wherein a distance between said magnetically soft layers is not substantially greater than said width.

31. The disk drive of claim 29, wherein said trailing magnetically soft layer contains a refractory metal.

32. The disk drive of claim 29, wherein said trailing magnetically soft layer contains material having a $B_s$ higher than that of Permalloy.

33. The disk drive of claim 29, wherein said leading magnetically soft layer is substantially perpendicular to said trailing magnetically soft layer.

34. The disk drive of claim 29, wherein said trailing magnetically soft layer contains vacuum-deposited material.

35. The disk drive of claim 29, further comprising a magnetoresistive sensor layer disposed adjacent said leading magnetically soft layer and oriented substantially perpendicular to said trailing magnetically soft layer.

36. The disk drive of claim 29, wherein said magnetically soft loop includes a magnetically soft trailing yoke layer that adjoins said trailing magnetically soft layer.

37. The disk drive of claim 29, wherein said trailing magnetically soft layer is laminated.

38. A disk drive comprising:
a rigid magnetic disk; and
an electromagnetic transducer disposed adjacent to said disk, the transducer including a magnetoresistive sensor layer, and a magnetically soft loop disposed adjacent to said magnetoresistive sensor layer, traversed by an electrically conductive coil section and including magnetically soft leading and trailing pole-tips disposed adjacent to a media-facing surface, said trailing pole-tip aligned with said magnetoresistive sensor layer along a longitudinal direction and having a width measured in a track-width direction that is perpendicular to said longitudinal direction, said longitudinal and track-width directions being substantially parallel to said media-facing surface, with said width being less than two hundred nanometers and greater than twenty angstroms;
wherein said trailing pole-tip has a length measured in said longitudinal direction, said length being at least five times greater than said width.

39. The disk drive of claim 38, wherein said leading and trailing pole-tips are separated by a submicron nonferromagnetic gap layer.

40. The disk drive of claim 38, wherein said trailing pole-tip consists essentially of sputtered material.

41. The disk drive of claim 38, wherein said trailing pole-tip contains material having a $B_s$ higher than that of Permalloy.

42. The disk drive of claim 38, wherein said magnetically soft loop includes a magnetically soft yoke layer adjoining said trailing pole-tip.

43. The disk drive of claim 42, wherein said yoke layer extends further in said track-width direction than in said longitudinal direction.

\* \* \* \* \*